(12) United States Patent
Kindo

(10) Patent No.: US 11,318,935 B2
(45) Date of Patent: May 3, 2022

(54) DRIVING ASSIST SYSTEM

(71) Applicant: TOYOTA JIDOSHA KABUSHIKI KAISHA, Toyota (JP)

(72) Inventor: Toshiki Kindo, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 96 days.

(21) Appl. No.: 16/840,975

(22) Filed: Apr. 6, 2020

(65) Prior Publication Data
US 2020/0377080 A1 Dec. 3, 2020

(30) Foreign Application Priority Data
May 28, 2019 (JP) .............................. JP2019-099576

(51) Int. Cl.
*B60W 30/09* (2012.01)
*B60W 60/00* (2020.01)
(Continued)

(52) U.S. Cl.
CPC ........ *B60W 30/09* (2013.01); *B60W 30/0953* (2013.01); *B60W 30/0956* (2013.01); *B60W 50/14* (2013.01); *B60W 60/0027* (2020.02); *B60W 60/0051* (2020.02); *B60W 60/0053* (2020.02); *G05D 1/0088* (2013.01);
(Continued)

(58) Field of Classification Search
CPC ............ B60W 30/09; B60W 60/0051; B60W 60/0053; B60W 30/0953; B60W 30/0956; B60W 60/0027; B60W 50/14; B60W 2710/20; B60W 2552/00; B60W 2520/10; B60W 2520/14; B60W 2420/42; B60W 2420/52; B60W 2554/4041;
(Continued)

(56) References Cited

U.S. PATENT DOCUMENTS

2018/0348758 A1 12/2018 Nakamura et al.
2019/0186947 A1* 6/2019 Rockmore ............ B60W 50/14
(Continued)

FOREIGN PATENT DOCUMENTS

| JP | 2017-218031 A | 12/2017 | |
| JP | 2018-203007 A | 12/2018 | |
| WO | WO-2018078335 A1 * | 5/2018 | ........... G05D 1/0061 |

*Primary Examiner* — Hunter B Lonsberry
*Assistant Examiner* — Harrison Heflin
(74) *Attorney, Agent, or Firm* — Sughrue Mion, PLLC

(57) ABSTRACT

Driving assist control has plural control modes associated with plural scenes on a one-to-one basis. A scene corresponding to driving environment for a vehicle is a subject scene, and a selected control mode is one associated with the subject scene. Plural pieces of scene description information respectively define the plural scenes. Selected scene description information is one defining the subject scene and indicates parameters used in the driving assist control of the selected control mode. A processor executes the driving assist control of the selected control mode based on the parameters indicated by the selected scene description information, and switches the selected control mode by switching the selected scene description information. When the subject scene changes, the processor notifies an occupant of the vehicle of switching of the selected control mode before switching the selected scene description information and the selected control mode.

6 Claims, 22 Drawing Sheets

| SCENE | | | CONTROL MODE OF DRIVING ASSIST CONTROL |
|---|---|---|---|
| ID | EXPLANATION | SCENE DESCRIPTION INFORMATION | |
| S1 | NO MOVING OBJECT | D1 | M1 |
| S2 | MOVING OBJECT EXISTS AT FORWARD POSITION IN SAME TRAVEL LANE | D2 | M2 |
| S3 | MOVING OBJECT EXISTS IN ADJACENT LANE | D3 | M3 |
| S4 | MOVING OBJECT EXISTS AT FORWARD POSITION IN SAME TRAVEL LANE AND ANOTHER MOVING OBJECT EXISTS IN ADJACENT LANE | D4 | M4 |
| S5 | MOVING OBJECT IN INTERSECTING LANE IN FRONT MERGES INTO TRAVEL LANE | D5 | M5 |
| S6 | MOVING OBJECT IN FRONT IN SAME TRAVEL LANE MOVES INTO INTERSECTING LANE | D6 | M6 |
| S7 | MOVING OBJECT EXISTS IN ONCOMING LANE | D7 | M7 |

(51) Int. Cl.
*B60W 30/095*   (2012.01)
*B60W 50/14*    (2020.01)
*G05D 1/02*     (2020.01)
*G05D 1/00*     (2006.01)
*G08G 1/16*     (2006.01)

(52) U.S. Cl.
CPC ............ *G05D 1/0214* (2013.01); *G08G 1/16* (2013.01); *B60W 2420/42* (2013.01); *B60W 2420/52* (2013.01); *B60W 2520/10* (2013.01); *B60W 2520/14* (2013.01); *B60W 2552/00* (2020.02); *B60W 2554/4041* (2020.02); *B60W 2710/18* (2013.01); *B60W 2710/20* (2013.01); *G05D 2201/0213* (2013.01)

(58) Field of Classification Search
CPC ............ B60W 2710/18; G05D 1/0214; G05D 1/0088; G05D 2201/0213; G08G 1/16
See application file for complete search history.

(56) References Cited

U.S. PATENT DOCUMENTS

| | | | |
|---|---|---|---|
| 2019/0256104 A1* | 8/2019 | Shimizu | B60W 30/09 |
| 2020/0031371 A1* | 1/2020 | Soliman | B60W 30/18 |
| 2020/0209857 A1* | 7/2020 | Djuric | G05D 1/0221 |
| 2020/0247426 A1* | 8/2020 | Rafferty | B60W 50/082 |
| 2020/0361456 A1* | 11/2020 | Stimpson | G05D 1/0088 |

* cited by examiner

| ID | SCENE EXPLANATION | SCENE DESCRIPTION INFORMATION | CONTROL MODE OF DRIVING ASSIST CONTROL |
|---|---|---|---|
| S1 | NO MOVING OBJECT | D1 | M1 |
| S2 | MOVING OBJECT EXISTS AT FORWARD POSITION IN SAME TRAVEL LANE | D2 | M2 |
| S3 | MOVING OBJECT EXISTS IN ADJACENT LANE | D3 | M3 |
| S4 | MOVING OBJECT EXISTS AT FORWARD POSITION IN SAME TRAVEL LANE AND ANOTHER MOVING OBJECT EXISTS IN ADJACENT LANE | D4 | M4 |
| S5 | MOVING OBJECT IN INTERSECTING LANE IN FRONT MERGES INTO TRAVEL LANE | D5 | M5 |
| S6 | MOVING OBJECT IN FRONT IN SAME TRAVEL LANE MOVES INTO INTERSECTING LANE | D6 | M6 |
| S7 | MOVING OBJECT EXISTS IN ONCOMING LANE | D7 | M7 |

*Fig. 2*

DRIVING ASSIST SYSTEM

BACKGROUND

Technical Field

The present disclosure relates to a driving assist system that executes driving assist control having a plurality of control modes associated with a plurality of scenes on a one-to-one basis.

Background Art

Patent Literature 1 discloses a vehicle control system that executes automated driving control. Automated driving modes include a first automated driving mode and a second automated driving mode whose automation level is lower than that of the first automated driving mode. When a driving operation member is not operated by an occupant and a direction of a face or a line of sight of the occupant is within a first angular range, the first automated driving mode is executed. When the driving operation member is not operated by the occupant and the direction of the face or the line of sight of the occupant is within a second angular range larger than the first angular range, the second automated driving mode is executed.

Patent Literature 2 discloses a mode switching informing device mounted on a vehicle. The mode switching informing device informs switching between an automated driving mode and a manual driving mode.

LIST OF RELATED ART

Patent Literature 1: Japanese Laid-Open Patent Application Publication No. JP-2018-203007

Patent Literature 2: Japanese Laid-Open Patent Application Publication No. JP-2017-218031

SUMMARY

A driving assist system executes driving assist control that assists driving of a vehicle. Here, let us consider the driving assist control that has a plurality of control modes associated with a plurality of scenes on a one-to-one basis. The driving assist system recognizes a scene and executes the driving assist control of a control mode associated with the recognized scene. When the scene changes, the driving assist system switches the control mode accordingly.

However, the change in the scene recognized by the driving assist system is unperceivable by an occupant of the vehicle. Therefore, if the control mode is switched by the driving assist system without any prior notification, the occupant of the vehicle may feel a sense of strangeness with the switching of the control mode.

An object of the present disclosure is to provide a technique that is related to driving assist control having a plurality of control modes associated with a plurality of scenes on a one-to-one basis and that can reduce a sense of strangeness felt by an occupant of a vehicle when the scene changes.

In an aspect of the present disclosure, a driving assist system that assists driving of a vehicle is provided.

The driving assist system includes:

a processor configured to execute driving assist control that has a plurality of control modes associated with a plurality of scenes on a one-to-one basis; and a memory device in which driving environment information indicating a driving environment for the vehicle and plural pieces of scene description information respectively defining the plurality of scenes are stored.

The processor recognizes a scene corresponding to the driving environment among the plurality of scenes as a subject scene, based on the driving environment information and the plural pieces of scene description information.

A selected control mode is one associated with the subject scene among the plurality of control modes.

Selected scene description information is one defining the subject scene among the plural pieces of scene description information and indicates parameters used in the driving assist control of the selected control mode.

The processor executes the driving assist control of the selected control mode based on the parameters indicated by the selected scene description information, and switches the selected control mode by switching the selected scene description information.

When the subject scene changes from a first scene to a second scene, the processor notifies an occupant of the vehicle of switching of the selected control mode before switching the selected scene description information and the selected control mode.

According to the present disclosure, when the subject scene changes from the first scene to the second scene, the driving assist system notifies the occupant of the vehicle of the switching of the selected control mode before switching the selected scene description information and the selected control mode. That is, the driving assist system does not execute the switching of the selected control mode with no prior notification but notifies the occupant of the vehicle in advance. Therefore, even when the switching of the selected control mode is subsequently executed, the sense of strangeness felt by the occupant of the vehicle is reduced.

BRIEF DESCRIPTION OF DRAWINGS

FIG. 2 is a diagram showing an example of a correspondence relationship between a plurality of scenes and a plurality of control modes of driving assist control in the embodiment of the present disclosure;

EMBODIMENTS

Embodiments of the present disclosure will be described below with reference to the attached drawings.

1. Driving Assist Control According to Scene 1-1. Driving Assist Control

Figure 1:
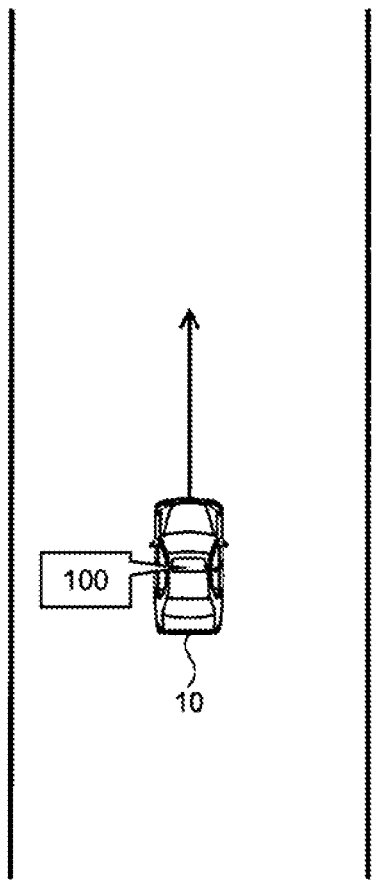
FIG. 1 is a conceptual diagram for explaining a driving assist system according to an embodiment of the present disclosure.

FIG. 1 is a conceptual diagram for explaining a driving assist system 100 according to the present embodiment. The driving assist system 100 executes "driving assist control" that assists driving of a vehicle 10. Typically, the driving assist system 100 is installed on the vehicle 10. Alternatively, the driving assist system 100 may be placed in an external device outside the vehicle 10 and remotely execute the driving assist control. Alternatively, the driving assist system 100 may be distributed in the vehicle 10 and the external device.

The driving assist control includes at least one of steering control, acceleration control, and deceleration control of the vehicle 10. That is, the driving assist system 100 assists the driving of the vehicle 10 by executing at least one of the steering control, the acceleration control, and the deceleration control. Such the driving assist control is exemplified by automated driving control, trajectory-following control, lane keep assist control (lane tracing assist control), adaptive cruise control (ACC), and so forth.

1-2. Scene and Control Mode

The driving assist control according to the present embodiment has a plurality of modes. A mode of the driving assist control is hereinafter referred to as a "control mode". Different control modes require different contents of the driving assist control. Switching the control mode makes it possible to change the contents of the driving assist control. Particularly, in the present embodiment, the control mode of the driving assist control is dynamically switched according to a "scene."

The scene means a situation in which the vehicle 10 is. In particular, the scene is defined by a configuration (arrangement) of the vehicle 10 and a moving object around the vehicle 10. The moving object is exemplified by another vehicle, a pedestrian, and the like around the vehicle 10. A plurality of control modes are associated with a plurality of scenes on a one-to-one basis, and the control mode is dynamically switched according to the scene.

FIG. 2 shows an example of a correspondence relationship between the plurality of scenes and the plurality of control modes. In the example shown in FIG. 2, a correspondence relationship between seven types of scenes S1 to S7 and seven types of control modes M1 to M7 is shown.

FIGS. 3 to 9 are conceptual diagrams for explaining the scenes S1 to S7, respectively. A configuration space CON shown in each of FIGS. 3 to 9 is a predetermined space around the vehicle 10. The moving object contributing to the scene is the moving object existing in the configuration space CON. That is, each scene is defined by the configuration (arrangement) of the vehicle 10 and the moving object in the configuration space CON. Although the configuration space CON has a rectangular shape in the example shown in FIGS. 3 to 9, its shape is arbitrary. A center position of the configuration space CON may be a position of the vehicle 10, or may be deviated from the position of the vehicle 10. For example, the configuration space CON ahead of the vehicle 10 may be larger than the configuration space CON behind the vehicle 10, because the moving object ahead of the vehicle 10 is particularly important in the driving assist control.

Hereinafter, the scenes S1 to S7 and the control modes M1 to M7 will be described with reference to FIGS. 2 to 9.

<Scene S1>

Figure 3:
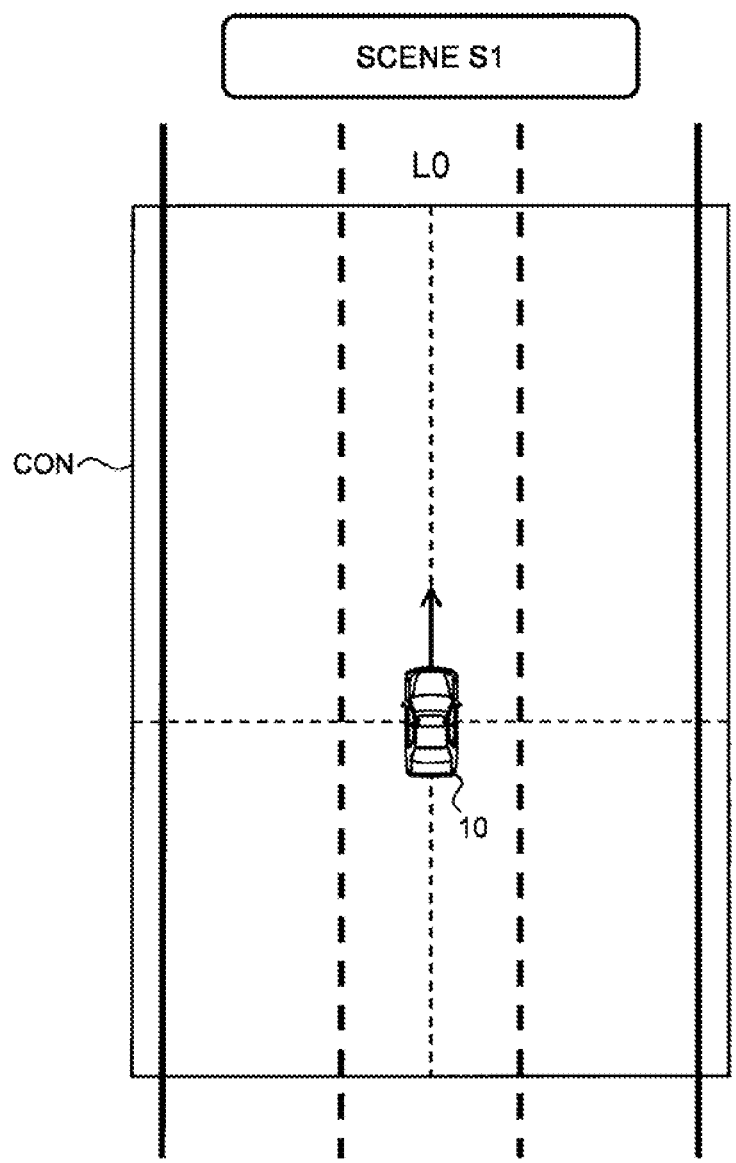
FIG. 3 is a conceptual diagram for explaining a scene S1.

The scene S1 and the control mode M1 will be described with reference to FIGS. 2 and 3. The scene S1 is a scene where there is no moving object in the configuration space CON. The control mode M1 is associated with this scene S1. For example, the driving assist control of the control mode M1 includes at least one of the trajectory-following control and the lane keep assist control. A target trajectory used in the trajectory-following control and the lane keep assist control is, for example, a center line of a travel lane L0 in which the vehicle 10 travels.

<Scene S2>

The scene S2 and the control mode M2 will be described with reference to FIGS. 2 and 4. The vehicle 10 travels in the travel lane L0. The scene S2 is a scene where a moving object 11 (e.g., a preceding vehicle) exists at a forward position in the same travel lane L0 as the vehicle 10. The control mode M2 is associated with this scene S2. In the driving assist control of the control mode M2, the moving object 11 in front is included in a monitoring target. For example, the driving assist control of the control mode M2 includes the adaptive cruise control (ACC) that follows the moving object 11, in addition to the driving assist control of the control mode M1 described above.

<Scene S3>

Figure 5:
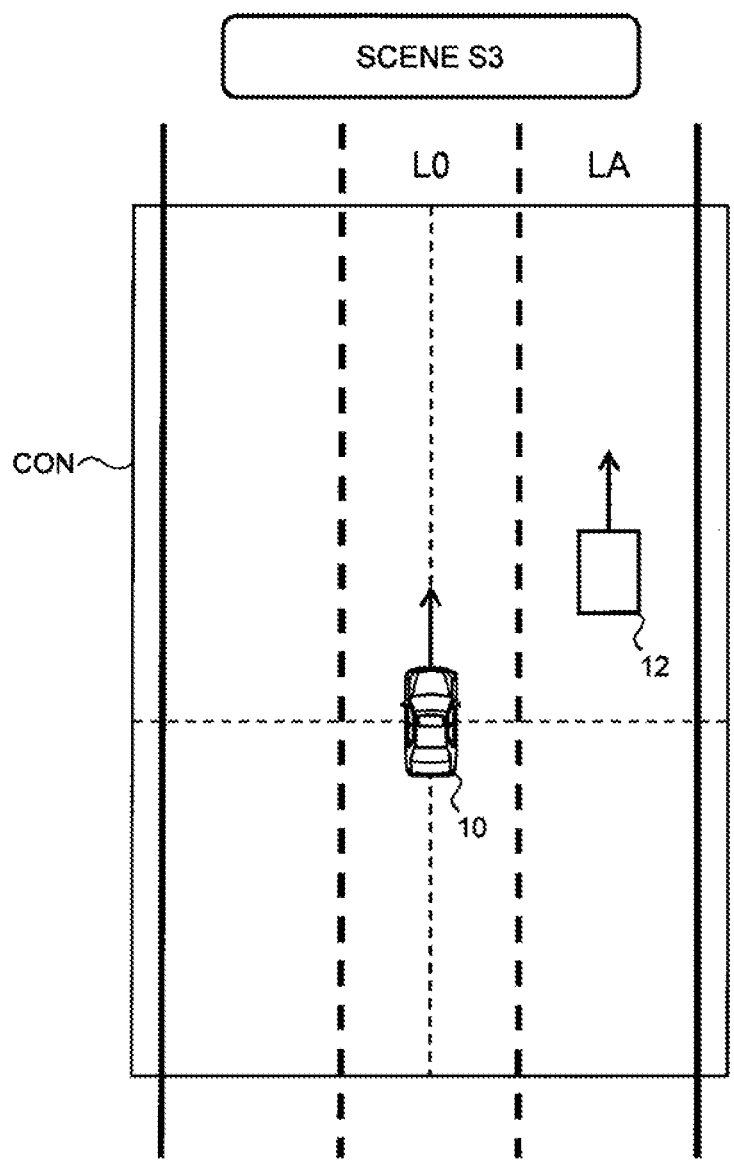
FIG. 5 is a conceptual diagram for explaining a scene S3.

The scene S3 and the control mode M3 will be described with reference to FIGS. 2 and 5. An adjacent lane LA is adjacent to the travel lane L0 in which the vehicle 10 travels. The scene S3 is a scene where a moving object 12 (e.g., an adjacent vehicle) exists in the adjacent lane LA. The control mode M3 is associated with this scene S3. In the driving assist control of the control mode M3, the moving object 12 in the adjacent lane LA is included in the monitoring target. For example, the driving assist control of the control mode M3 includes such control that pays attention to and deals with a lane change (cutting-in) of the moving object 12, in addition to the driving assist control of the control mode M1 described above. The control for dealing with the lane change includes deceleration control, for example.

<Scene S4>

Figure 6:
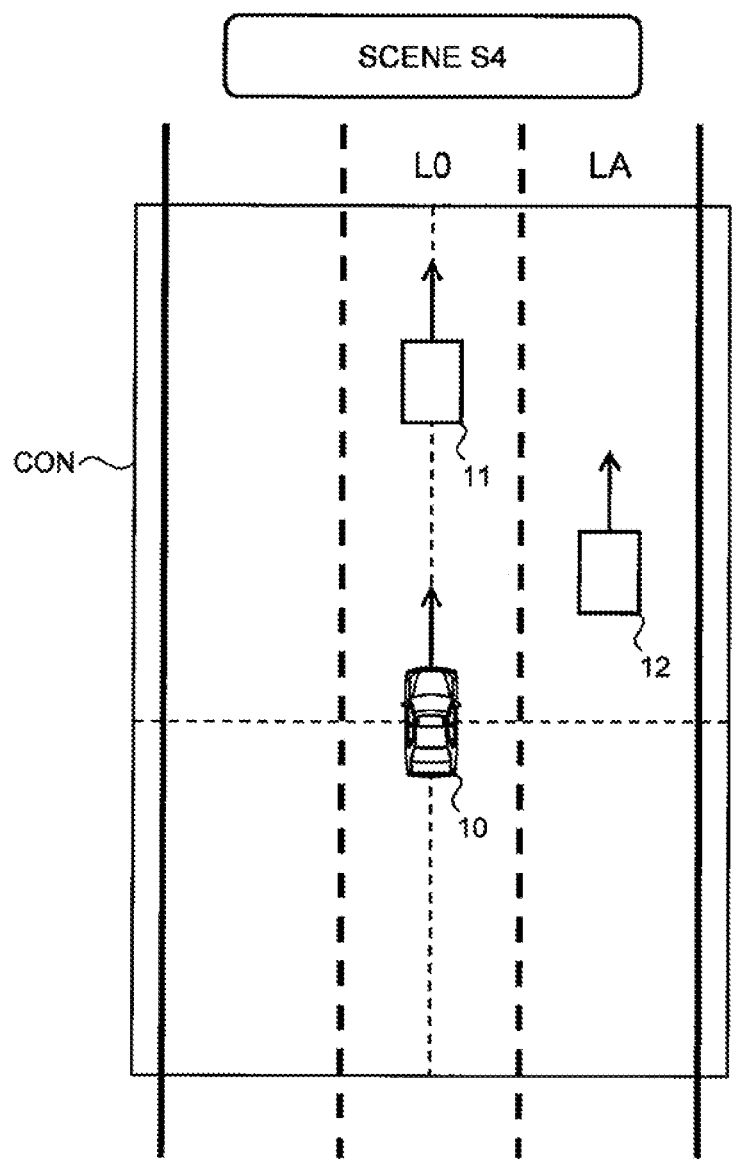
FIG. 6 is a conceptual diagram for explaining a scene S4.

The scene S4 and the control mode M4 will be described with reference to FIGS. 2 and 6. The scene S4 is a combination of the scene S2 and the scene S3 descried above. That is, the moving object 11 exists in the travel lane L0 and the moving object 12 exists in the adjacent lane LA. The control mode M4 is associated with this scene S4. In the driving assist control of the control mode M4, both of the moving object 11 in front and the moving object 12 in the adjacent lane LA are included in the monitoring target. The driving assist control of the control mode M4 is a combination of the driving assist control of the control mode M2 and the driving assist control of the control mode M3.

<Scene S5>

Figure 7:
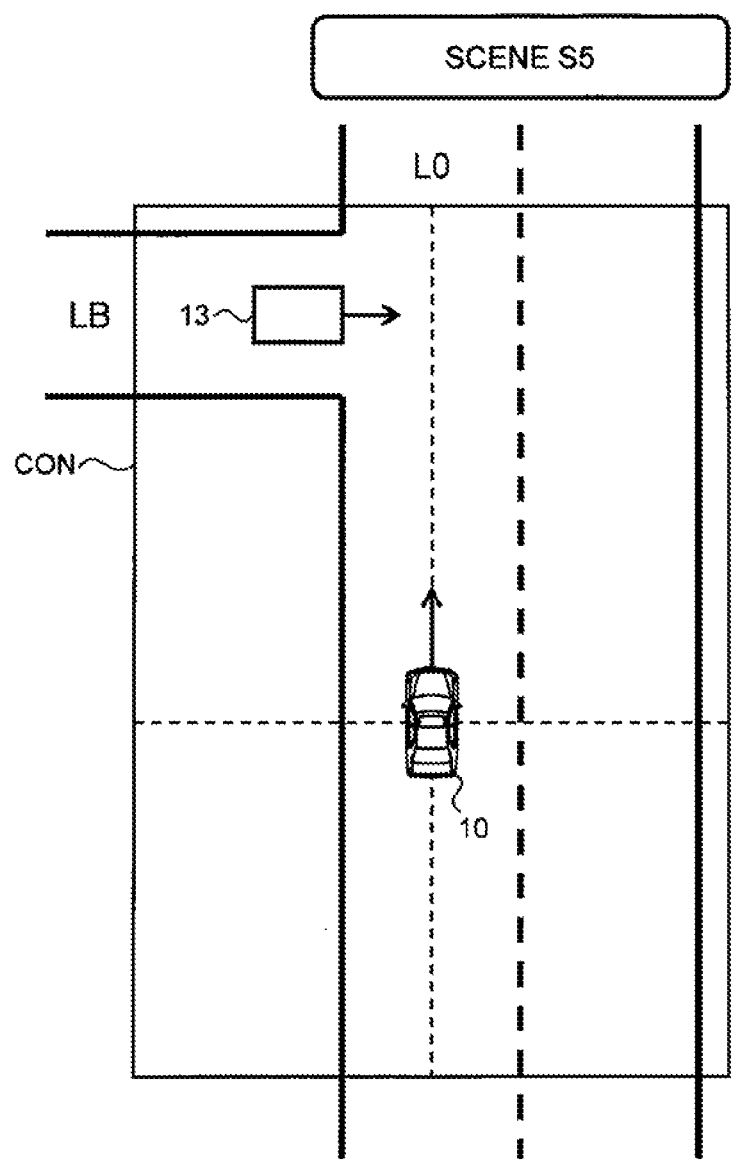
FIG. 7 is a conceptual diagram for explaining a scene S5.

The scene S5 and the control mode M5 will be described with reference to FIGS. 2 and 7. There is an intersecting lane LB that intersects with the travel lane L0 ahead of the vehicle 10. The scene S5 is a scene where a moving object 13 in the intersecting lane LB merges (proceeds) into the travel lane L0. The control mode M5 is associated with this scene S5. In the driving assist control of the control mode M5, the moving object 13 is included in the monitoring target. For example, the driving assist control of the control mode M5 includes such control that watches out for and avoids a collision with the moving object 13, in addition to the driving assist control of the control mode M1 described above. The control for avoiding the collision with the moving object 13 includes deceleration control, for example.

<Scene S6>

Figure 8:
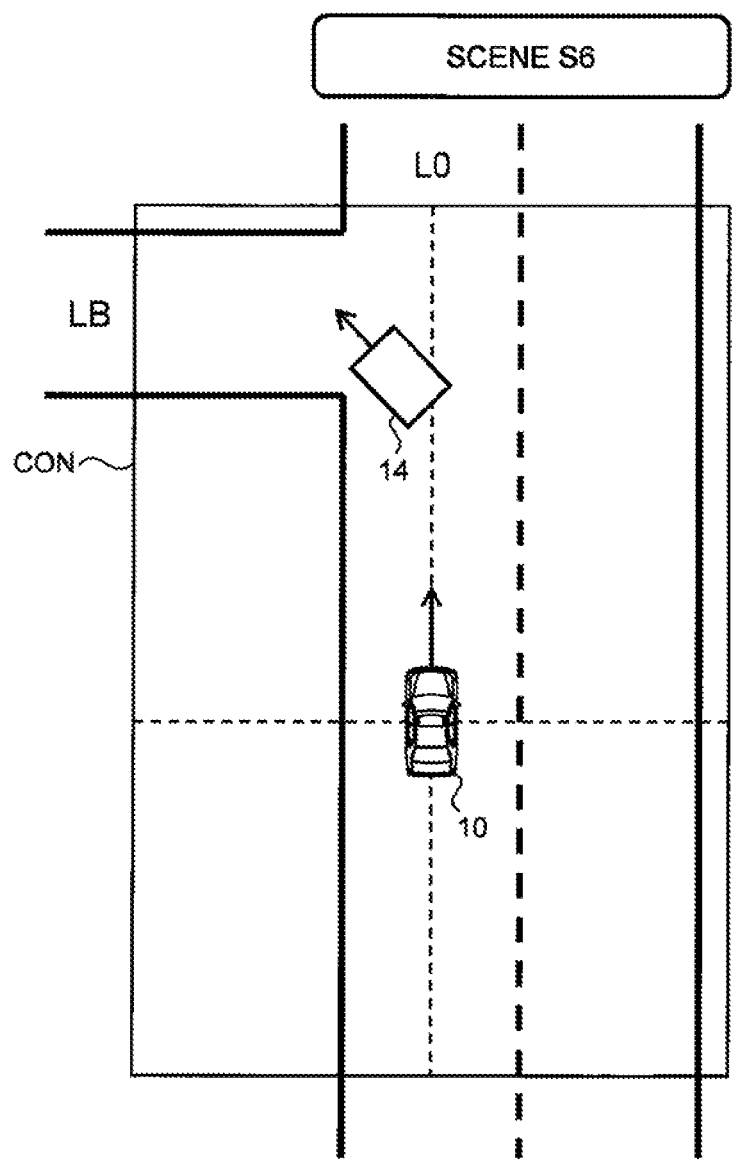
FIG. 8 is a conceptual diagram for explaining a scene S6.

The scene S6 and the control mode M6 will be described with reference to FIGS. 2 and 8. There is an intersecting lane LB that intersects with the travel lane L0 ahead of the vehicle 10. The scene S6 is a scene where a moving object 14 in front in the travel lane L0 moves (goes out) into the intersecting lane LB. The control mode M6 is associated with this scene S6. In the driving assist control of the control mode M6, the moving object 14 is included in the monitoring target. For example, the driving assist control of the control mode M6 includes such control that does not follow the moving object 14 and pays attention to a behavior of the moving object 14, in addition to the driving assist control of the control mode M1 described above.

<Scene S7>

Figure 9:
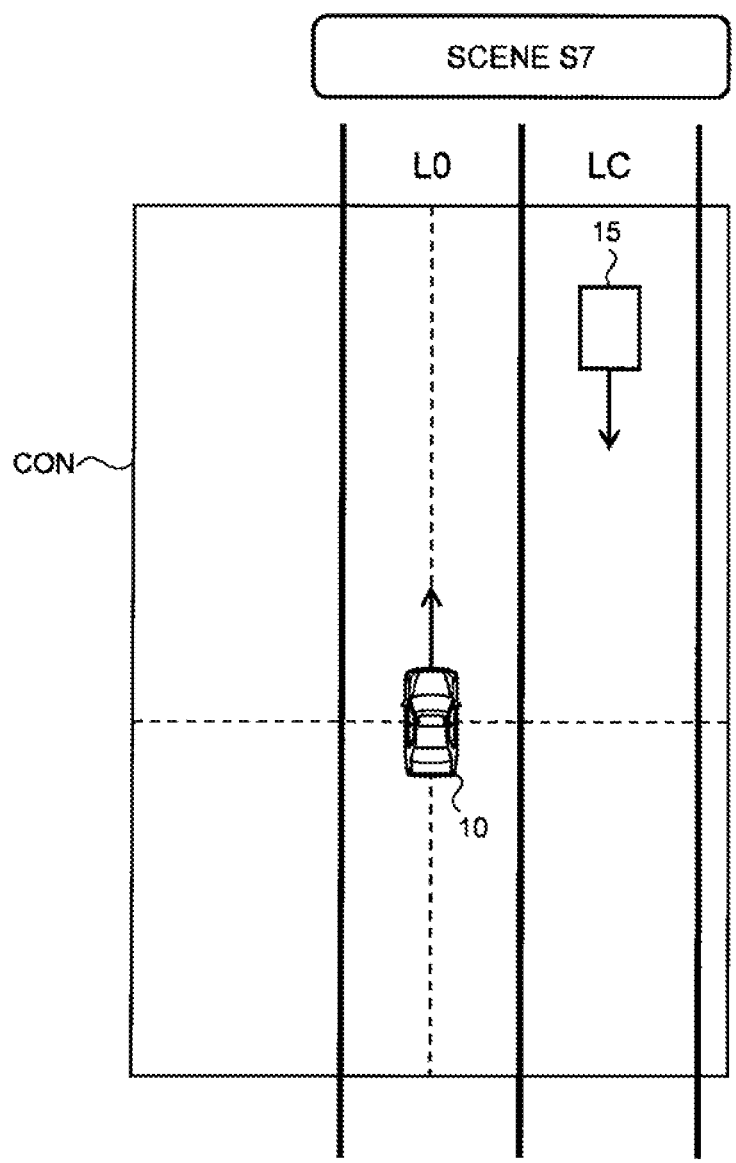
FIG. 9 is a conceptual diagram for explaining a scene S7.

The scene S7 and the control mode M7 will be described with reference to FIGS. 2 and 9. The vehicle 10 travels in the travel lane L0. There is an oncoming lane (opposite lane) LC adjacent to the travel lane L0. The scene S7 is a scene where a moving object 15 (e.g., an oncoming vehicle) exists in the oncoming lane LC. The control mode M7 is associated with this scene S7. In the driving assist control of the control mode M7, the moving object 15 in the oncoming lane LC is included in the monitoring target. For example, the driving assist control of the control mode M7 includes such control that pays attention to a behavior of the moving object 15, in addition to the driving assist control of the control mode M1 described above.

1-3. Scene Description Information

Scene description information is information defining the scene and prepared for each scene. As shown in FIG. 2, plural pieces of scene description information D1 to D7 define the plurality of scenes S1 to S7, respectively. It can also be said that the plural pieces of scene description information D1 to D7 are associated with the plurality of control modes M1 to M7 on a one-to-one basis.

More specifically, the scene description information indicates parameters that define the scene (i.e., the configuration of the vehicle 10 and the moving object). The parameters defining the scene include vehicle parameters regarding the vehicle 10 and moving object parameters regarding the moving object.

The vehicle parameters regarding the vehicle 10 include, for example, a lane $L_0$ (=the travel lane L0) in which the vehicle 10 exists, a position $X_0$ of the vehicle 10 in a direction along the lane $L_0$, a velocity $V_0$ of the vehicle 10, and an orientation $H_0$ of the vehicle 10. For simplicity, a direction of the velocity $V_0$ may be regarded as the orientation $H_0$.

A moving object i (i=1 to k; k is an integer equal to or greater than 1) within the configuration space CON is considered. The moving object parameters regarding the moving object i include, for example, a type $C_i$ of the moving object i, a lane $L_i$ in which the moving object i exists, a position $X_i$ of the moving object i in a direction along the lane $L_i$, a velocity $V_i$ of the moving object i, and an orientation $H_i$ of the moving object i. For simplicity, a direction of the velocity $V_i$ may be regarded as the orientation $H_i$.

It should be noted that in the present embodiment, the parameters such as the position and the velocity may be parameters in an absolute coordinate system or may be parameters in a relative coordinate system. For example, the relative coordinate system is fixed to the vehicle 10 and moves with a movement of the vehicle 10. Typically, the origin of the relative coordinate system is a predetermined position on the vehicle 10, but it is not limited to that.

A relative relationship of the moving object i with respect to the vehicle 10 is expressed by $\delta L_i = L_i - L_0$, $\delta X_i = X_i - X_0$, and $\delta V_i = V_i - V_0$. These parameters $\delta L_i$, $\delta X_i$, and $\delta V_i$ may be used as the moving object parameters instead of $L_i$, $X_i$, and $V_i$.

Figure 10:
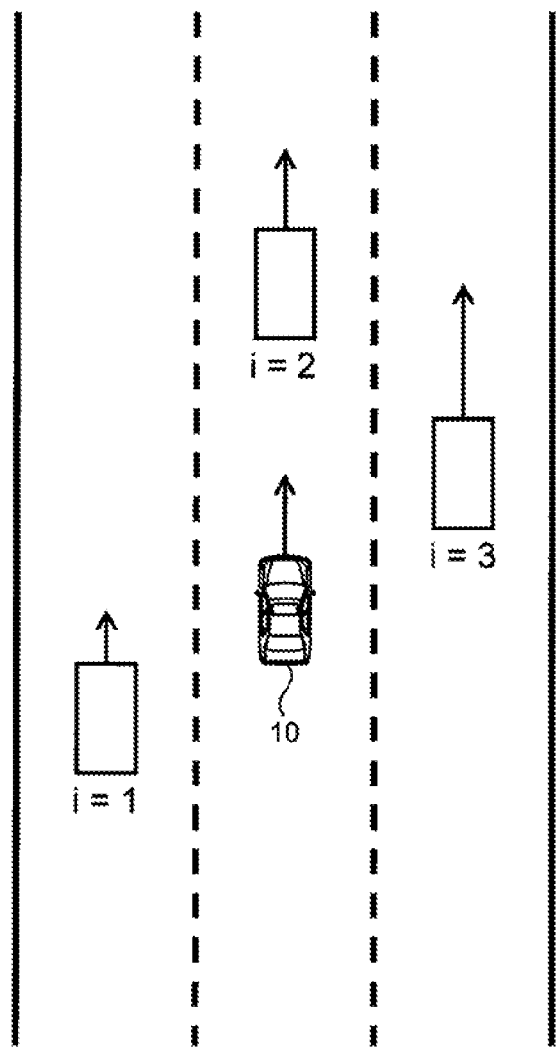
FIG. 10 is a conceptual diagram for explaining an example of scene description information in the embodiment of the present disclosure.

Some examples of the relative relationship of the moving object i with respect to the vehicle 10 are described with reference to FIG. 10. When the vehicle 10 passes over a moving object (i=1) in a left adjacent lane, the relative relationship of the moving object (i=1) is expressed by "$\delta L_1 = -1$, $\delta X_1 < 0$, $\delta V_1 < 0$." When an inter-vehicle distance between the vehicle 10 and a moving object (i=2) in front is decreasing, the relative relationship of the moving object (i=2) is expressed by "$\delta L_2 = 0$, $\delta X_2 > 0$, $\delta V_2 < 0$." When a moving object (i=3) in a right adjacent lane passes over the vehicle 10, the relative relationship of the moving object (i=3) is expressed by "$\delta L_3 = 1$, $\delta X_3 > 0$, $\delta V_3 > 0$."

The scene description information D1 defining the scene S1 includes a parameter set $[(L_0, X_0, V_0, H_0)]$. Each of the scene description information D2 to D7 defining the scenes S2 to S7 includes a parameter set $[(L_0, X_0, V_0, H_0), (C_i, L_i, X_i, V_i, H_i)]$ or a parameter set $[(L_0, X_0, V_0, H_0), (C_i, \delta L_i, \delta X_i, \delta V_i, H_i)]$.

The parameters indicated by the scene description information defining a scene are used in the driving assist control of the control mode associated with the scene. That is, the driving assist control of the control modes M1 to M7 is executed based on the scene description information D1 to D7, respectively. It is possible to switch the control mode by switching the scene description information to be used.

1-4. Scene Recognition Processing

The driving assist system 100 executes "scene recognition processing" that recognizes the scene. In the scene recognition processing, driving environment information is used in addition to the above-described scene description information D1 to D7.

The driving environment information is information indicating a driving environment for the vehicle 10. For example, the driving environment information includes map information, vehicle position information, vehicle state information, surrounding situation information, and the like. The map information indicates a lane configuration around the vehicle 10. The vehicle position information indicates a position and an orientation of the vehicle 10. The vehicle state information indicates a state (e.g., velocity) of the vehicle 10. The surrounding situation information includes information (position, velocity, etc.) of the moving object around the vehicle 10. Typically, the driving environment information is obtained by sensors mounted on the vehicle 10.

The driving assist system 100 recognizes a scene corresponding to the driving environment among the plurality of scenes S1 to S7 based on the driving environment information and the scene description information D1 to D7. More specifically, the vehicle parameters can be recognized from the map information, the vehicle position information, and the vehicle state information. The moving object parameters can be recognized from the map information, the vehicle position information, the vehicle state information, and the surrounding situation information. It is therefore possible to determine to which one of the scenes S1 to S7 defined by the scene description information D1 to D7 the driving environment indicated by the driving environment information corresponds.

Figure 4:
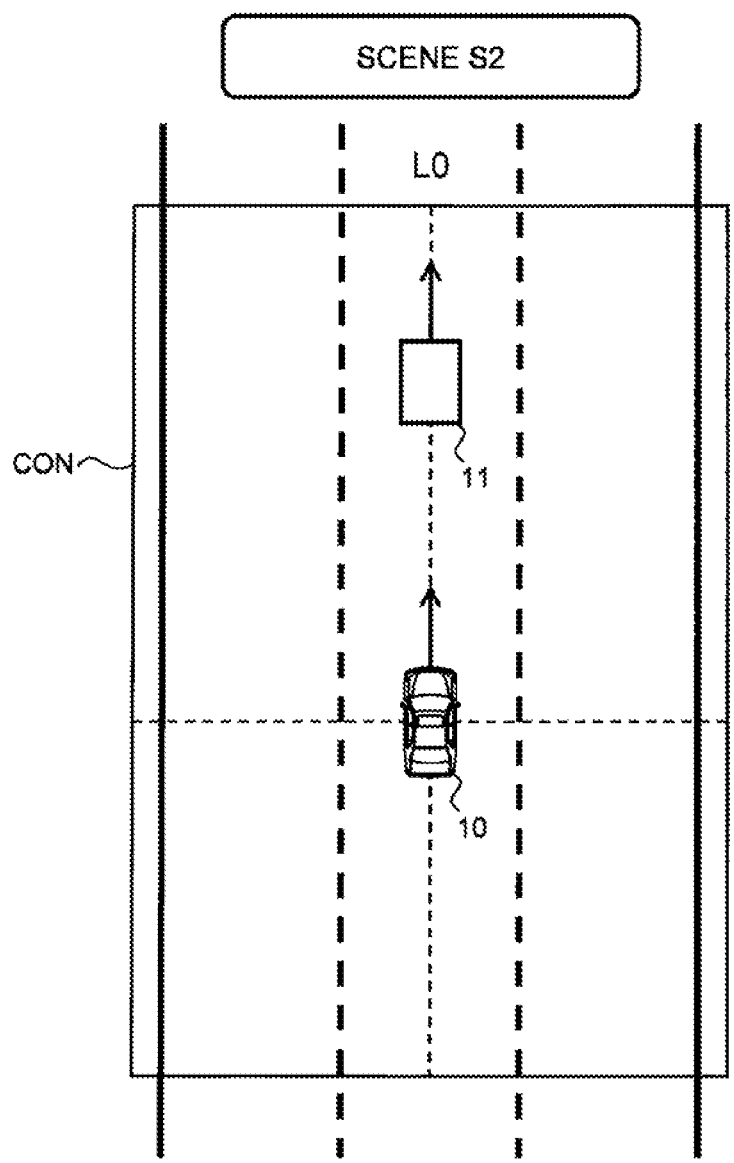
FIG. 4 is a conceptual diagram for explaining a scene S2.

As an example, a driving environment where the moving object 11 exists in the travel lane L0 and no moving object exists in the adjacent lane LA as shown in FIG. 4 is considered. Since this driving environment is consistent with the scene description information D2, the scene S2 is recognized as the scene corresponding to (consistent with) the driving environment. As another example, a driving environment where the moving object 11 exists in the travel lane L0 and the moving object 12 exists in the adjacent lane LA as shown in FIG. 6 is considered. Since this driving environment is consistent with the scene description information D4, the scene S4 is recognized as the scene corresponding to (consistent with) the driving environment.

The scene recognized by the scene recognition processing, that is, the scene corresponding to the driving environment is hereinafter referred to as a "subject scene ST." The driving assist system 100 can detect a change in the subject scene ST by repeatedly recognizing the subject scene ST.

As another example, the driving assist system 100 may deduce the subject scene ST and its change from a viewpoint of a probability. An example of a method of deducing the subject scene ST and its change will be described with reference to FIGS. 11 and 12.

Figure 11:
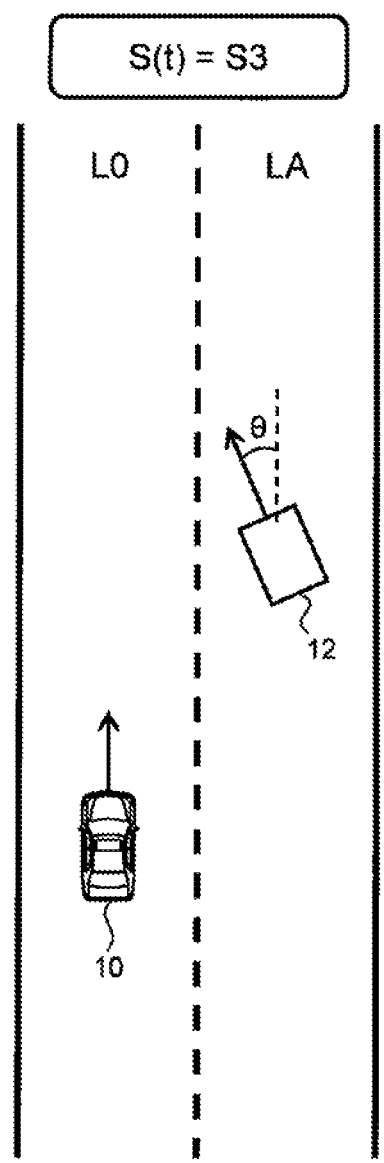
FIG. 11 is a conceptual diagram for explaining an example of scene recognition processing according to the embodiment of the present disclosure.

FIG. 11 shows a scene at a time t. In the example shown in FIG. 11, a scene S(t) at the time t is the scene S3, and the moving object 12 exists in the adjacent lanes LA. An angle between the orientation $H_2$ of the moving object 12 and a lane longitudinal direction is denoted by $\theta$.

Figure 12:
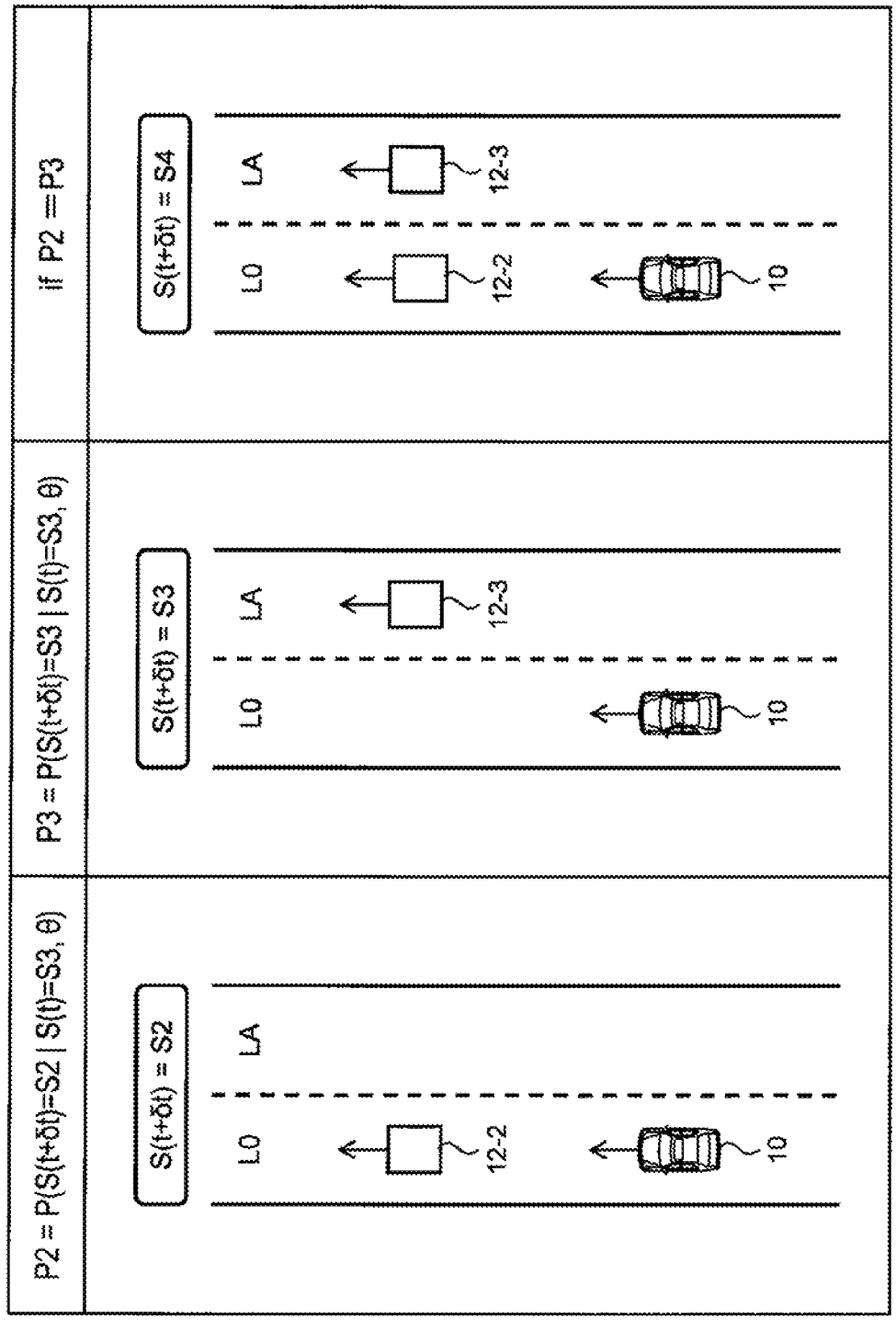
FIG. 12 is a conceptual diagram for explaining an example of the scene recognition processing according to the embodiment of the present disclosure.

FIG. 12 shows examples of a scene S(t+δt) at a time t+δt. If the moving object 12 moves from the adjacent lane LA into the travel lane L0 during the period δt, the scene S(t+δt) is the scene S2. The moving object 12 in this case is hereinafter referred to as a moving object 12-2 for the purpose of convenience. A probability P2 that the scene S(t+δt) is the scene S2 is expressed as follows.

$$P2=P(S(t+δt)=S2|S(t)=S3, \theta)$$

On the other hand, if the moving object 12 keeps remaining in the adjacent lane LA during the period δt, the scene S(t+δt) is the scene S3. The moving object 12 in this case is hereinafter referred to as a moving object 12-3 for the purpose of convenience. A probability P3 that the scene S(t+δt) is the scene S3 is expressed as follows.

$$P3=P(S(t+δt)=S3|S(t)=S3, \theta)$$

These probabilities P2 and P3 are formulated in advance based on a result of observation of a real traffic environment. To improve accuracy, other variables in addition to the angle $\theta$ may be taken into consideration. For example, the velocity $V_i$ of the moving object i and a lateral position of the moving object i in the lane may be used as the variables. A distance between a center position of the moving object i and a lane centerline or a distance between a side edge position of the moving object i and a lane boundary line is used as the lateral position of the moving object i.

Typically, the scene S(t+δt) at the time t+δt is deduced to be the scene with the highest probability. For example, when the probability P2 is the highest, the scene S(t+δt) is deduced to be the scene S2. In this case, it is deduced that a change from the scene S3 to the scene S2 occurs. On the other hand, when the probability P3 is the highest, the scene S(t+δt) is deduced to be the scene S3. In this case, it is deduced that no scene change occurs.

There may be a case where there is little difference between the highest probability and the second highest probability. In this case, not only the scene with the highest probability but also the scene with the second highest probability may be taken into consideration.

For instance, let us consider a situation where the probability P2 and the probability P3 are almost the same in the example shown in FIGS. 11 and 12. Such the situation may occur during a period when the moving object 12 makes a lane change from the adjacent lane LA to the travel lane L0. In that case, the moving object 12-2 is deemed to exist in the travel lane L0 and the moving object 12-3 is deemed to exist in the adjacent lane LA as shown in a right column in FIG. 12. In other words, the scene S2 with the probability P2 and the scene S3 with the probability P3 are combined with each other. As a result, the scene S(t+δt) at the time t+δt is deduced to be the scene S4.

It should be noted that the case where the scene S(t) at the time t is the scene S3 is described in the above example, and the same applies to other cases.

1-5. Driving Assist Control According to Subject Scene

As described above, the driving assist system 100 recognizes the subject scene ST by executing the scene recognition processing. One that defines the subject scene ST among the plural pieces of scene description information D1 to D7 is hereinafter referred to as "selected scene description information DS." One associated with the subject scene ST among the plurality of control modes M1 to M7 is hereinafter referred to as a "selected control mode MS." The subject scene ST, the selected scene description information DS, and the selected control mode MS are associated with each other.

The driving assist system 100 executes the driving assist control based on the selected scene description information DS. More specifically, the selected scene description information DS indicates the parameters used in the driving assist control of the selected control mode MS. The driving assist system 100 executes the driving assist control of the selected control mode MS based on the parameters indicated by the selected scene description information DS.

1-6. Mode Switching Processing

Furthermore, the driving assist system 100 detects a change in the subject scene ST by repeatedly executing the scene recognition processing. When the subject scene ST changes, it is necessary to switch the selected control mode MS accordingly. The driving assist system 100 can switch the selected control mode MS by switching the selected scene description information DS according to the change in the subject scene ST.

However, the change in the subject scene ST recognized by the driving assist system 100 is unperceivable by an occupant (e.g., a driver) of the vehicle 10. Therefore, if the selected control mode MS is switched by the driving assist system 100 without any prior notification, the occupant of the vehicle 10 may feel a sense of strangeness with the switching. In order to reduce such the occupant's sense of strangeness, the driving assist system 100 according to the present embodiment executes "mode switching processing" as described below.

1-6-1. Situation where Notification is Made

Hereinafter, the subject scene ST before the change is referred to as a "first scene" and the subject scene ST after the change is referred to as a "second scene." When the subject scene ST changes from the first scene to the second scene, the driving assist system 100 notifies the occupant of the vehicle 10 of the switching of the selected control mode MS before switching the selected scene description information DS and the selected control mode MS. That is, the driving assist system 100 does not execute the switching of the selected control mode MS with no prior notification but notifies the occupant of the vehicle 10 in advance. Therefore, even when the switching of the selected control mode MS is subsequently executed, the sense of strangeness felt by the occupant of the vehicle 10 is reduced.

Figure 13:
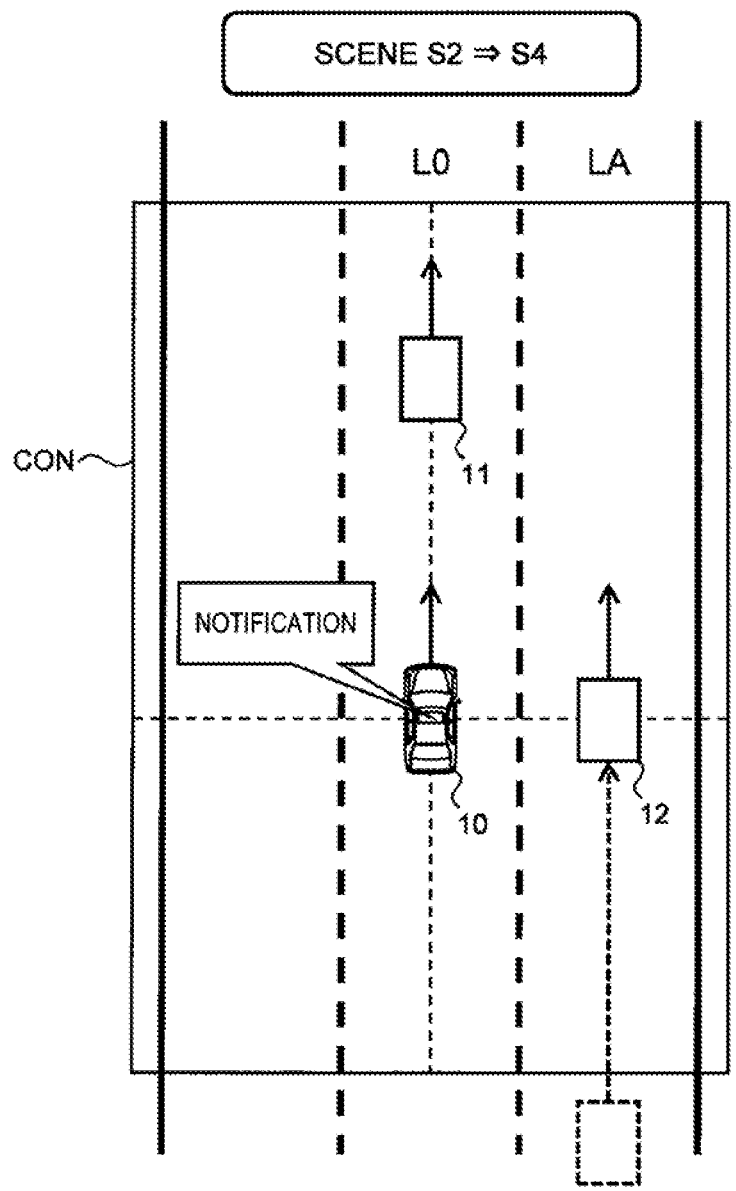
FIG. 13 is a conceptual diagram for explaining an example of mode switching processing according to the embodiment of the present disclosure.

FIG. 13 is a conceptual diagram for explaining an example of the mode switching processing according to the present embodiment. The subject scene ST before the change (i.e., the first scene) is the scene S2. That is, the moving object 11 exists in the travel lane L0 and no moving object exists in the adjacent lane LA. The driving assist system 100 executes the driving assist control of the control mode M2 based on the scene description information D2.

After that, the number of moving objects included in the configuration space CON increases. More specifically, the moving object 12 in the adjacent lane LA is added. That is, the subject scene ST changes from the scene S2 to the scene S4. In this case, it is necessary to switch the selected scene description information DS from the scene description information D2 to the scene description information D4, and to switch the selected control mode MS from the control mode M2 to the control mode M4. The driving assist system 100 according to the present embodiment notifies the occupant of the vehicle 10 of the switching before executing the switching. Therefore, even when the switching of the selected control mode MS is subsequently executed, the sense of strangeness felt by the occupant of the vehicle 10 is reduced.

In particular, in the example shown in FIG. 13, the number of moving objects to be considered in the driving assist control increases. In other words, the number of parameters and the types of parameters used in the driving assist control are increased due to the switching of the selected scene description information DS. Therefore, the switching of the selected scene description information DS (i.e., the selected control mode MS) is likely to cause control discontinuity and thus a discontinuous change in behavior of the vehicle 10. According to the present embodiment, the switching is notified in advance to the occupant of the vehicle 10, and thus the sense of strangeness felt by the occupant is reduced even if the behavior of the vehicle 10 changes discontinuously.

Figure 14:
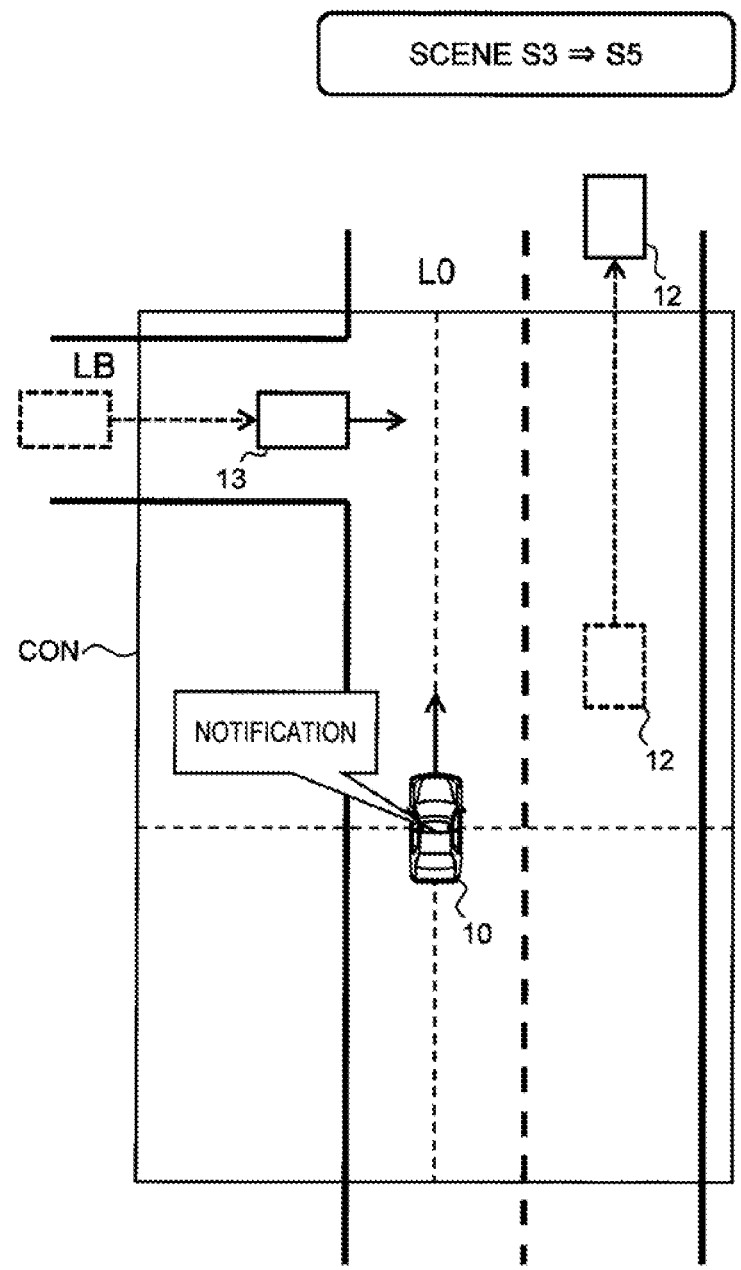
FIG. 14 is a conceptual diagram for explaining another example of the mode switching processing according to the embodiment of the present disclosure.

FIG. 14 is a conceptual diagram for explaining another example of the mode switching processing according to the present embodiment. The subject scene ST before the change (i.e., the first scene) is the scene S3. That is, the moving object 12 exists in the adjacent lane LA. The driving assist system 100 executes the driving assist control of the control mode M3 based on the scene description information D3.

After that, the type of the moving object included in the configuration space CON changes. More specifically, the moving object 12 in the adjacent lane LA moves out of the configuration space CON and concurrently the moving object 13 in the intersecting lane LB intersecting with the travel lane L0 moves into the configuration space CON. That is, the subject scene ST changes from the scene S3 to the scene S5. In this case, it is necessary to switch the selected scene description information DS from the scene description information D3 to the scene description information D5, and to switch the selected control mode MS from the control mode M3 to the control mode M5. The driving assist system 100 according to the present embodiment notifies the occupant of the vehicle 10 of the switching before executing the switching. Therefore, even when the switching of the selected control mode MS is subsequently executed, the sense of strangeness felt by the occupant of the vehicle 10 is reduced.

In particular, in the example shown in FIG. 14, the type of the moving object to be considered in the driving assist control changes. In other words, the type of the parameters used in the driving assist control is changed due to the switching of the selected scene description information DS. Therefore, the switching of the selected scene description information DS (i.e., the selected control mode MS) is likely to cause control discontinuity and thus a discontinuous change in behavior of the vehicle 10. According to the present embodiment, the switching is notified in advance to the occupant of the vehicle 10, and thus the sense of strangeness felt by the occupant is reduced even if the behavior of the vehicle 10 changes discontinuously.

A generalization of the examples shown in FIGS. 13 and 14 is as follows. At least a part of the parameters indicated by the selected scene description information DS regarding the second scene after the change is not indicated by the selected scene description information DS regarding the first scene before the change. In other words, at least a part of the parameters indicated by the selected scene description information DS regarding the second scene after the change is different from the parameters indicated by the selected scene description information DS regarding the first scene before the change. In this case, the switching of the selected scene description information DS (i.e., the selected control mode MS) is likely to cause the control discontinuity and thus the discontinuous change in the behavior of the vehicle 10. It is therefore preferable to beforehand notify the occupant of the vehicle 10 of the switching.

When notifying the occupant of the vehicle 10 of the switching, the driving assist system 100 may request the occupant for "approval" of the switching. When the occupant approves the switching, the driving assist system 100 executes the switching. On the other hand, when the occupant refuses the switching, the driving assist system 100 requests a driver of the vehicle 10 to perform manual driving. It is thus possible to reflect an intention of the occupant of the vehicle 10 in the mode switching processing. This is preferable from a viewpoint of convenience.

1-6-2. Situation where Notification is not Made

The notification to the occupant of the vehicle 10 is not always performed. In some cases, the driving assist system 100 may execute the switching of the selected scene description information DS and the selected control mode MS without beforehand notifying the occupant of the vehicle 10 of the switching of the selected control mode MS. As a result, excessive notifications are suppressed.

Figure 15:
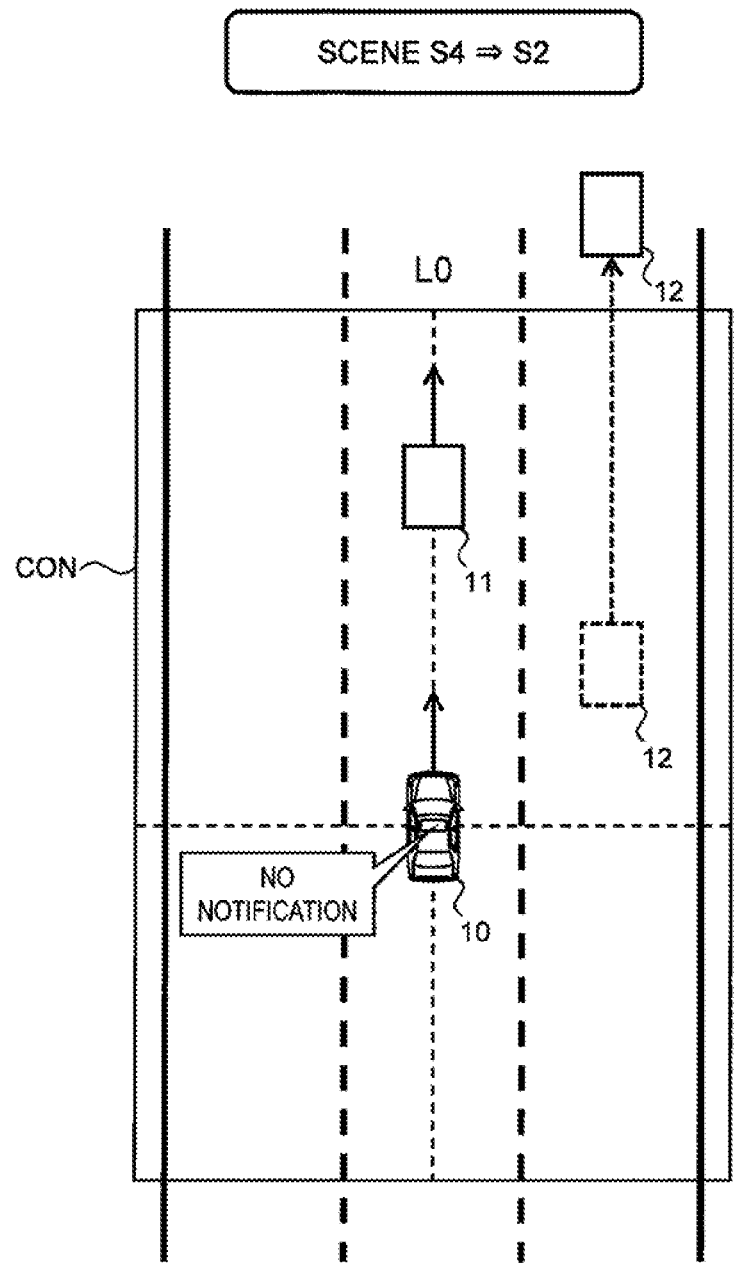
FIG. 15 is a conceptual diagram for explaining still another example of the mode switching processing according to the embodiment of the present disclosure.

As an instance, the situation shown in FIG. 15 is considered. The subject scene ST before the change is the scene S4. That is, the moving object 11 exists in the travel lane L0 and the moving object 12 exists in the adjacent lane LA. The driving assist system 100 executes the driving assist control of the control mode M4 based on the scene description information D4.

After that, the number of moving objects and the types of moving objects included in the configuration space CON decrease. More specifically, the moving object 12 in the adjacent lane LA moves out of the configuration space CON. That is, the subject scene ST changes from the scene S4 to the scene S2. In this case, it is necessary to switch the selected scene description information DS from the scene description information D4 to the scene description information D2, and to switch the selected control mode MS from the control mode M4 to the control mode M2.

In the example shown in FIG. 15, the number of parameters and the types of parameters used in the driving assist control are decreased due to the switching of the selected scene description information DS. In this case, the switching of the selected scene description information DS (i.e., the selected control mode MS) does not cause the control discontinuity and the discontinuous change in behavior of the vehicle 10. In this case, the sense of strangeness is not caused. Therefore, it is not always necessary to beforehand notify the occupant of the vehicle 10 of the switching.

A generalization is as follows. In order to distinguish from the above-described case where the notification is made (see Section 1-6-1), the subject scene ST before the change is referred to as a "third scene", and the subject scene ST after the change is referred to as a "fourth scene." When the subject scene ST changes from the third scene to the fourth scene, the driving assist system 100 executes the switching of the selected scene description information DS and the selected control mode MS without beforehand notifying the occupant of the vehicle 10 of the switching of the selected control mode MS. Since excessive notifications are suppressed, processing load applied on the driving assist system 100 is reduced. Moreover, since some notifications are omitted, the switching of the selected control mode MS is quickly achieved. Furthermore, discomfort with the excessive notifications is suppressed.

In particular, when all of the parameters indicated by the selected scene description information DS regarding the fourth scene are included in the parameters indicated by the selected scene description information DS regarding the third scene, the control discontinuity is not caused and thus the behavior of the vehicle 10 does not change discontinuously. In this case, the occupant of the vehicle 10 does not feel the sense of strangeness with the switching of the selected scene description information DS and the selected control mode MS. It is therefore preferable to execute the switching without beforehand notifying the occupant of the vehicle 10 of the switching. Since an unnecessary notification is suppressed, processing load applied on the driving assist system 100 is reduced. Moreover, since the unnecessary notification is omitted, the switching of the selected control mode MS is quickly achieved. Furthermore, discomfort with the unnecessary notification is suppressed.

Hereinafter, the driving assist system 100 according to the present embodiment will be described in more details.

2. Configuration Example of Driving Assist System

Figure 16:
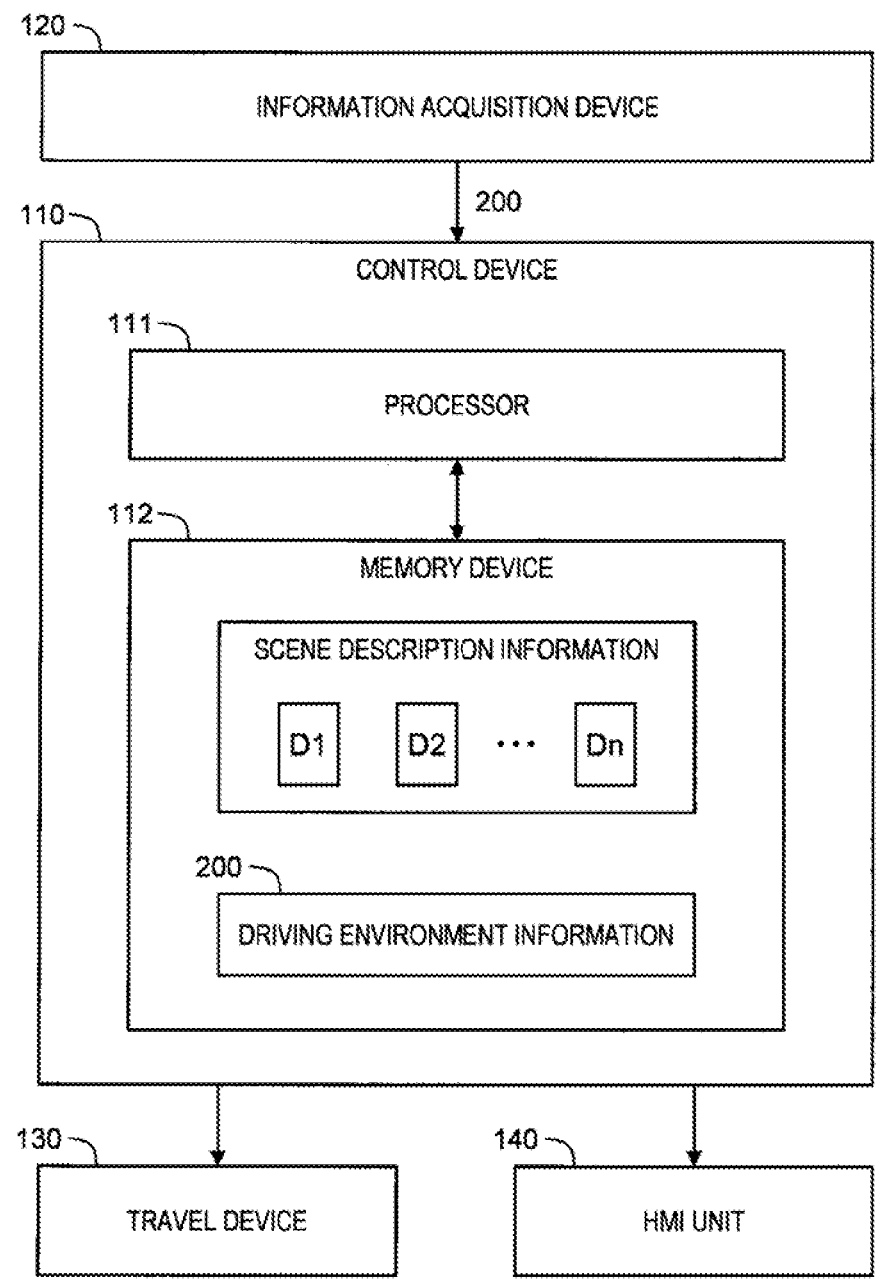
FIG. 16 is a block diagram schematically showing a configuration example of the driving assist system according to the embodiment of the present disclosure.

FIG. 16 is a block diagram schematically showing a configuration example of the driving assist system 100 according to the present embodiment. The driving assist system 100 includes a control device (controller) 110, an information acquisition device 120, a travel device 130, and an HMI (Human-Machine Interface) unit 140.

The information acquisition device 120 acquires the driving environment information 200. The driving environment information 200 is information indicating a driving environment for the vehicle 10 and necessary for the driving assist control.

Figure 17:
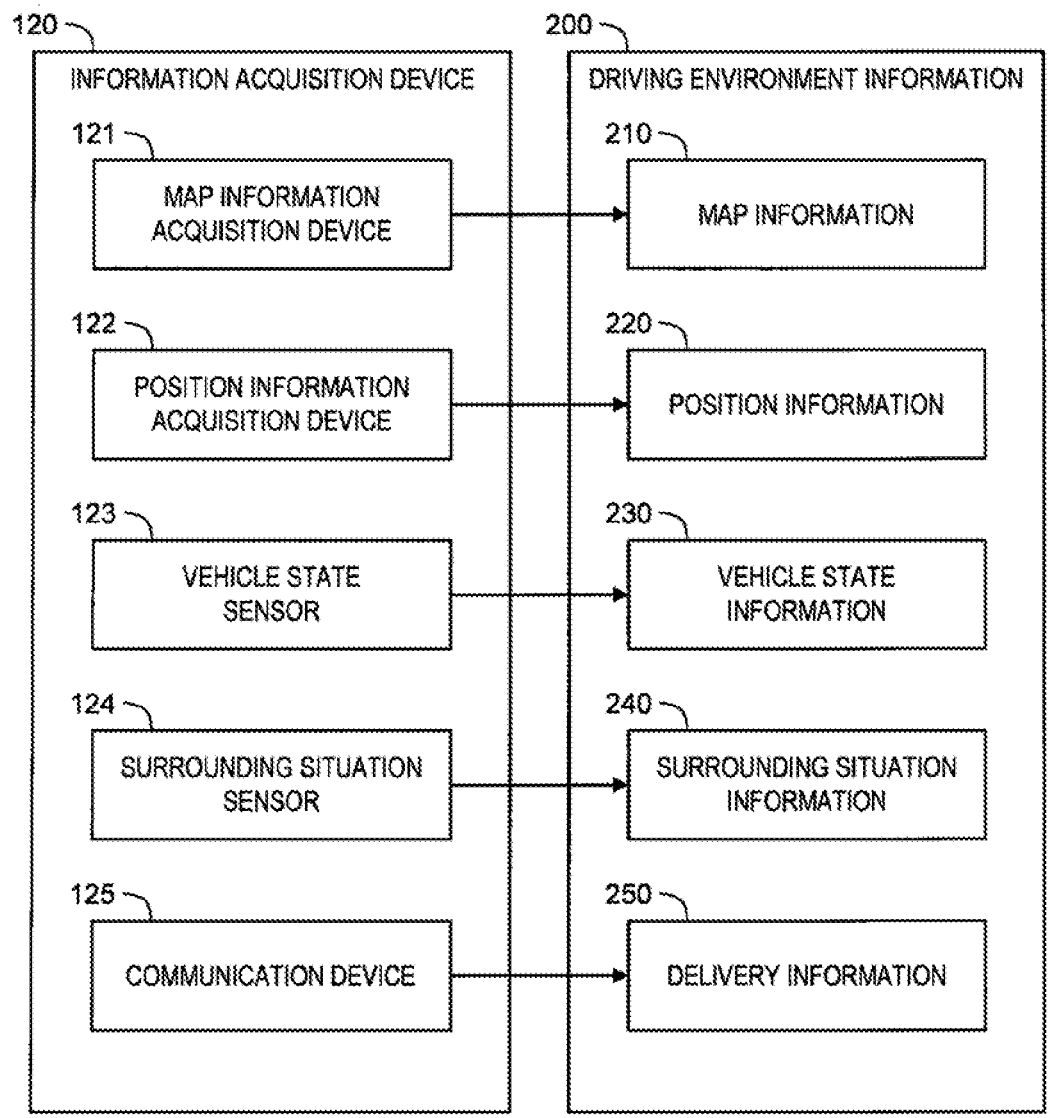
FIG. 17 is a block diagram showing an example of an information acquisition device and driving environment information in the driving assist system according to the embodiment of the present disclosure.

FIG. 17 is a block diagram showing an example of the information acquisition device 120 and the driving environment information 200. The information acquisition device 120 includes a map information acquisition device 121, a position information acquisition device 122, a vehicle state sensor 123, a surrounding situation sensor 124, and a communication device 125. The driving environment information 200 includes map information 210, position information 220, vehicle state information 230, surrounding situation information 240, and delivery information 250.

The map information acquisition device 121 acquires the map information 210. The map information 210 indicates at least a lane configuration. It is possible to recognize the number of lanes, lane merging, lane branching, lane intersection, and the like by reference to the map information 210. The map information acquisition device 121 acquires the map information 210 of a required area from a map database. The map database may be stored in a predetermined memory device mounted on the vehicle 10, or may be stored in a management server outside the vehicle 10. In the latter case, the map information acquisition device 121 communicates with the management server to acquire the necessary map information 210.

The position information acquisition device 122 acquires the position information 220 that indicates a position and an attitude (e.g. orientation) of the vehicle 10. For example, the position information acquisition device 122 includes a GPS (Global Positioning System) device that measures the position and the orientation (azimuth) of the vehicle 10. The position information acquisition device 122 may further include an attitude sensor that detects the attitude of the vehicle 10.

The vehicle state sensor 123 acquires the vehicle state information 230 that indicates a state of the vehicle 10. For example, the vehicle state sensor 123 includes a vehicle speed sensor, a yaw rate sensor, an acceleration sensor, a steering angle sensor, and so forth. The vehicle speed sensor detects a vehicle speed (i.e., a speed of the vehicle 10). The yaw rate sensor detects a yaw rate of the vehicle 10. The acceleration sensor detects an acceleration (e.g., a lateral acceleration, a longitudinal acceleration, and a vertical acceleration) of the vehicle 10. The steering angle sensor detects a steering angle of the vehicle 10.

The surrounding situation sensor 124 recognizes (detects) a situation around the vehicle 10. For example, the surrounding situation sensor 124 includes at least one of a camera, a LIDAR (Laser Imaging Detection and Ranging), and a radar. The surrounding situation information 240 indicates a result of recognition by the surrounding situation sensor 124. For example, the surrounding situation information 240 includes target information regarding a target recognized by the surrounding situation sensor 124. The target is exemplified by a surrounding vehicle, a white line, an obstacle, a roadside structure, and so forth. The target information includes information on a relative position and a relative velocity of the target with respect to the vehicle 10.

The communication device 125 communicates with the outside of the vehicle 10. For example, the communication device 125 communicates with an external device outside the vehicle 10 through a communication network. The communication device 125 may perform a V2I communication (vehicle-to-infrastructure communication) with a surrounding infrastructure. The communication device 125 may perform a V2V communication (vehicle-to-vehicle communication) with a surrounding vehicle. The delivery information 250 is information acquired through the communication device 125. For example, the delivery information 250 includes information (e.g., a position, an orientation, a velocity, and the like) of the surrounding vehicle acquired through the V2V communication.

The travel device 130 includes a steering device, a driving device, and a braking device. The steering device turns (i.e., changes a direction of) a wheel of the vehicle 10. For example, the steering device includes a power steering (EPS: Electric Power Steering) device. The driving device is a power source that generates a driving force. The driving device is exemplified by an engine, an electric motor, an in-wheel motor, and the like. The braking device generates a braking force.

The HMI unit 140 is an interface for proving the occupant (e.g., the driver) of the vehicle 10 with information and receiving information from the occupant. More specifically, the HMI unit 140 includes an input device and an output device. The input device is exemplified by a touch panel, a switch, a microphone, and the like. The output device is exemplified by a display device, a speaker, and the like.

The control device (controller) 110 includes a processor 111 and a memory device 112. For example, the control device 110 is a microcomputer. A variety of information is stored in the memory device 112. For example, plural pieces of scene description information D1 to Dn respectively defining the plurality of scenes S1 to Sn are stored in the memory device 112 (here, n is an integer equal to or greater than 2). In addition, the driving environment information 200 acquired by the information acquisition device 120 is stored in the memory device 112.

The processor 111 executes a variety of processing by executing a computer program. The computer program is stored in the memory device 112 or recorded on a computer-readable recording medium.

For example, the processor 111 acquires the driving environment information 200 from the information acquisition device 120 and stores the driving environment information 200 in the memory device 112.

Moreover, the processor 111 executes vehicle travel control that controls travel of the vehicle 10. More specifically, the processor 111 executes the vehicle travel control by controlling an operation of the travel device 130. The vehicle travel control includes the steering control, the acceleration control, and the deceleration control. The steering control is performed through the steering device. The acceleration control is performed through the driving device. The deceleration control is performed through the braking device.

The processor 111 executes the driving assist control by appropriately executing the vehicle travel control. More specifically, the processor 111 creates a travel plan required for the driving assist control based on the driving environment information 200. For example, the travel plan includes a target trajectory including a target position and a target velocity. The processor 111 generates the target trajectory based on the driving environment information 200. Then, the processor 111 executes the vehicle travel control such that the vehicle 10 travels in accordance with the travel plan.

Hereinafter, a process flow of the driving assist control according to the scene will be described.

3. Process Flow

Figure 18:
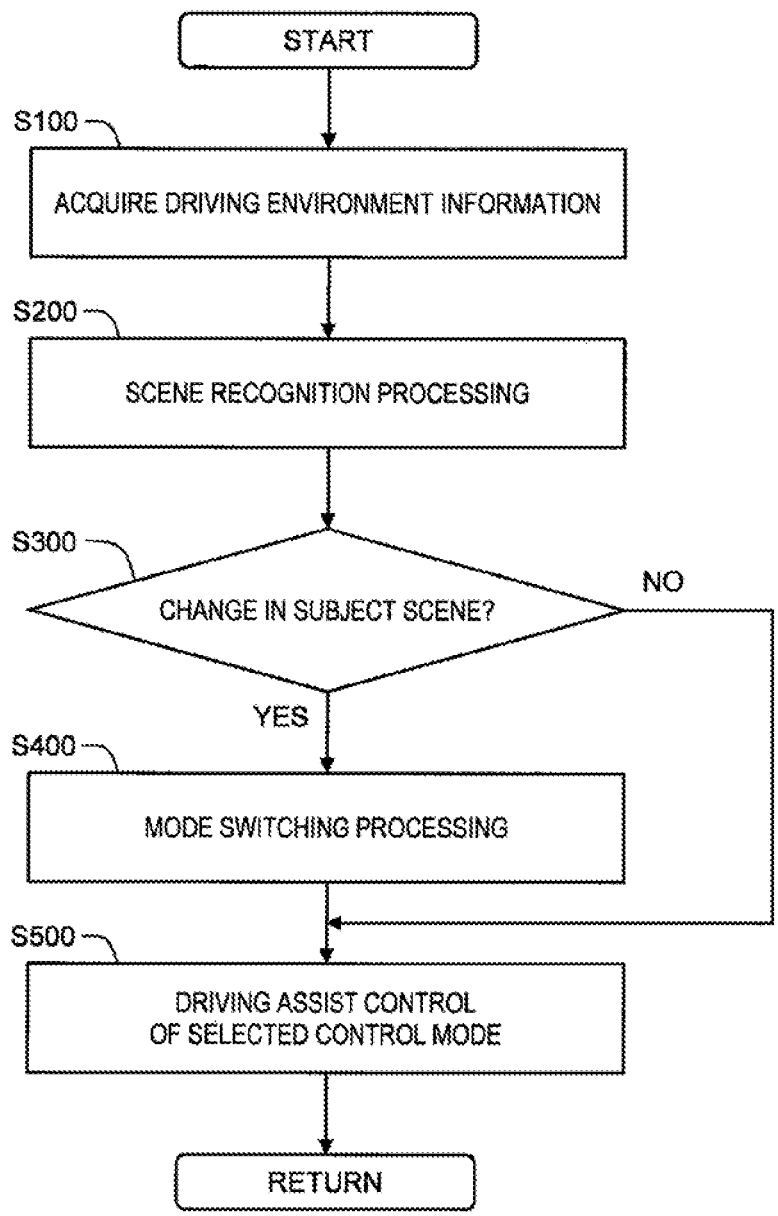
FIG. 18 is a flow chart showing processing by the driving assist system according to the embodiment of the present disclosure.

FIG. 18 is a flow chart showing processing by the driving assist system 100 according to the present embodiment.

In Step S100, the information acquisition device 120 acquires the driving environment information 200 (see FIG. 17). The control device 110 (i.e., the processor 111) receives the driving environment information 200 from the information acquisition device 120 and stores the driving environment information 200 in the memory device 112.

In Step S200, the processor 111 executes the scene recognition processing (see Section 1-1). The scene description information D1 to Dn and the driving environment information 200 are stored in the memory device 112. Based on the scene description information D1 to Dn and the driving environment information 200, the processor 111 recognizes a scene corresponding to the driving environment indicated by the driving environment information 200 as the "subject scene ST."

More specifically, the lane configuration is obtained from the map information 210. The position and the orientation of the vehicle 10 are obtained from the position information 220. The speed of the vehicle 10 is obtained from the vehicle state information 230. The information (e.g., the position, the orientation, the velocity) of the moving object i around the vehicle 10 is obtained from the surrounding situation information 240 or the distribution information 250. That is, it is possible to recognize the vehicle parameters and the moving object parameters based on the driving environment information 200. Therefore, it is possible to determine to which scene defined by the scene description information the driving environment indicated by the driving environment information 200 corresponds.

In Step S300, the processor 111 determines whether or not a change in the subject scene ST occurs. When a change in the subject scene ST occurs (Step S300; Yes), the processing proceeds to Step S400. On the other hand, when the subject scene ST is not changed (step S300; No), the processing skips Step S400 and proceeds to Step S500.

In Step S400, the processor 111 executes the mode switching processing. Various examples of the mode switching processing will be described later.

In the subsequent Step S500, the processor 111 executes the driving assist control based on the selected scene description information DS. More specifically, the selected scene description information DS indicates the parameters used in the driving assist control of the selected control mode MS. The processor 111 executes the driving assist control of the selected control mode MS based on the parameters indicated by the selected scene description information DS.

Hereinafter, various examples of the mode switching processing (Step S400) will be described.

3-1. First Example

Figure 19:
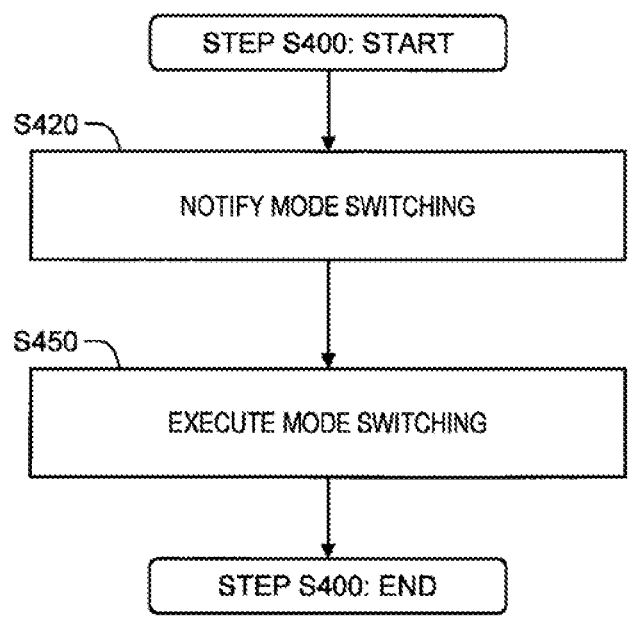
FIG. 19 is a flow chart showing a first example of the mode switching processing according to the embodiment of the present disclosure.

FIG. 19 is a flow chart showing a first example of the mode switching processing. In Step S420, the processor 111 notifies the occupant of the vehicle 10 of the switching of the selected control mode MS through the HMI unit 140 (i.e., the output device). For example, the notification includes at least one of a display notification and a voice notification.

In Step S450 after Step S420, the processor 111 executes the switching of the selected control mode MS. More specifically, the processor 111 switches the selected control mode MS by switching the selected scene description information DS according to the change in the subject scene ST.

According to the first example, the switching of the selected control mode MS is not executed with no prior notification but beforehand notified to the occupant of the vehicle 10. Therefore, the occupant's sense of strangeness with the switching is reduced.

3-2. Second Example

Figure 20:
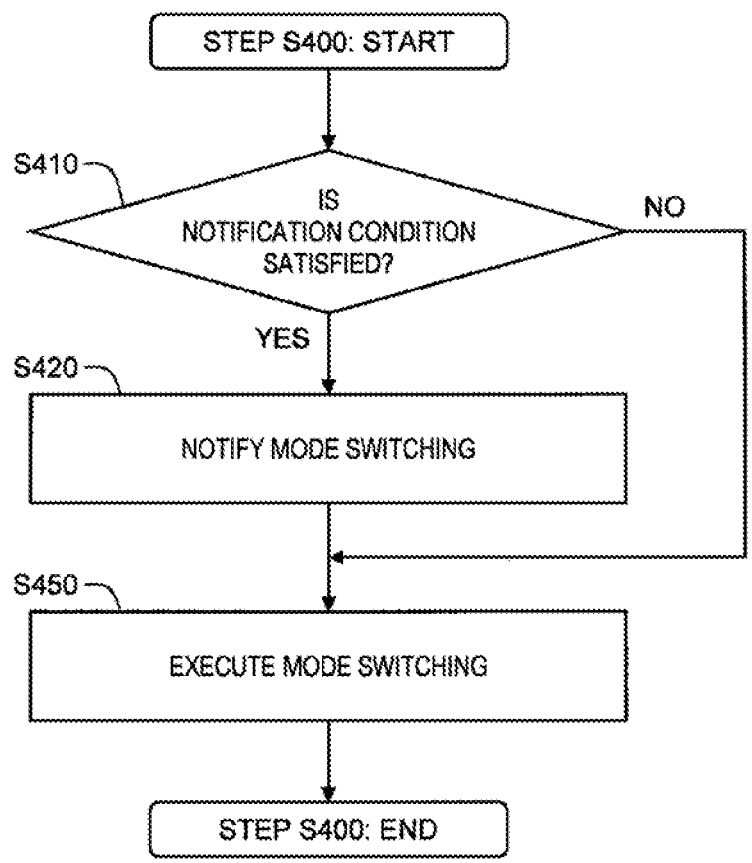
FIG. 20 is a flow chart showing a second example of the mode switching processing according to the embodiment of the present disclosure.

FIG. 20 is a flow chart showing a second example of the mode switching processing. An overlapping description with the first example will be omitted as appropriate.

In Step S410 prior to Step S420, the processor 111 determines whether or not a "notification condition" is satisfied. The notification condition is a condition for executing Step S420. More specifically, the notification condition is that "at least a part of the parameters indicated by the selected scene description information DS regarding the second scene after the change is not indicated by the selected scene description information DS regarding the first scene before the change" (see Section 1-6-1, FIGS. 13 and 14).

When the notification condition is satisfied (Step S410; Yes), the processing proceeds to Step S420 and the prior notification to the occupant of the vehicle 10 is made. When the notification condition is satisfied, the control discontinuity and thus the discontinuous change in the behavior of the vehicle 10 are likely to occur in the mode switching (Step S450). However, the switching is notified in advance to the occupant of the vehicle 10, and thus the sense of strangeness felt by the occupant is reduced even if the behavior of the vehicle 10 changes discontinuously.

On the other hand, when the notification condition is not satisfied (Step S410; No), the processing skips Step S420 and proceeds to Step S450. That is, the mode switching (Step S450) is executed without prior notification to the occupant of the vehicle 10. When the notification condition is not satisfied, the control discontinuity is not caused and thus the behavior of the vehicle 10 does not change discontinuously (see Section 1-6-2, FIG. 15). Since an unnecessary notification is suppressed, processing load applied on the driving assist system 100 is reduced. Moreover, since the unnecessary notification is omitted, the switching of the selected control mode MS is quickly achieved. Furthermore, discomfort with the unnecessary notification is suppressed.

3-3. Third Example

Figure 21:
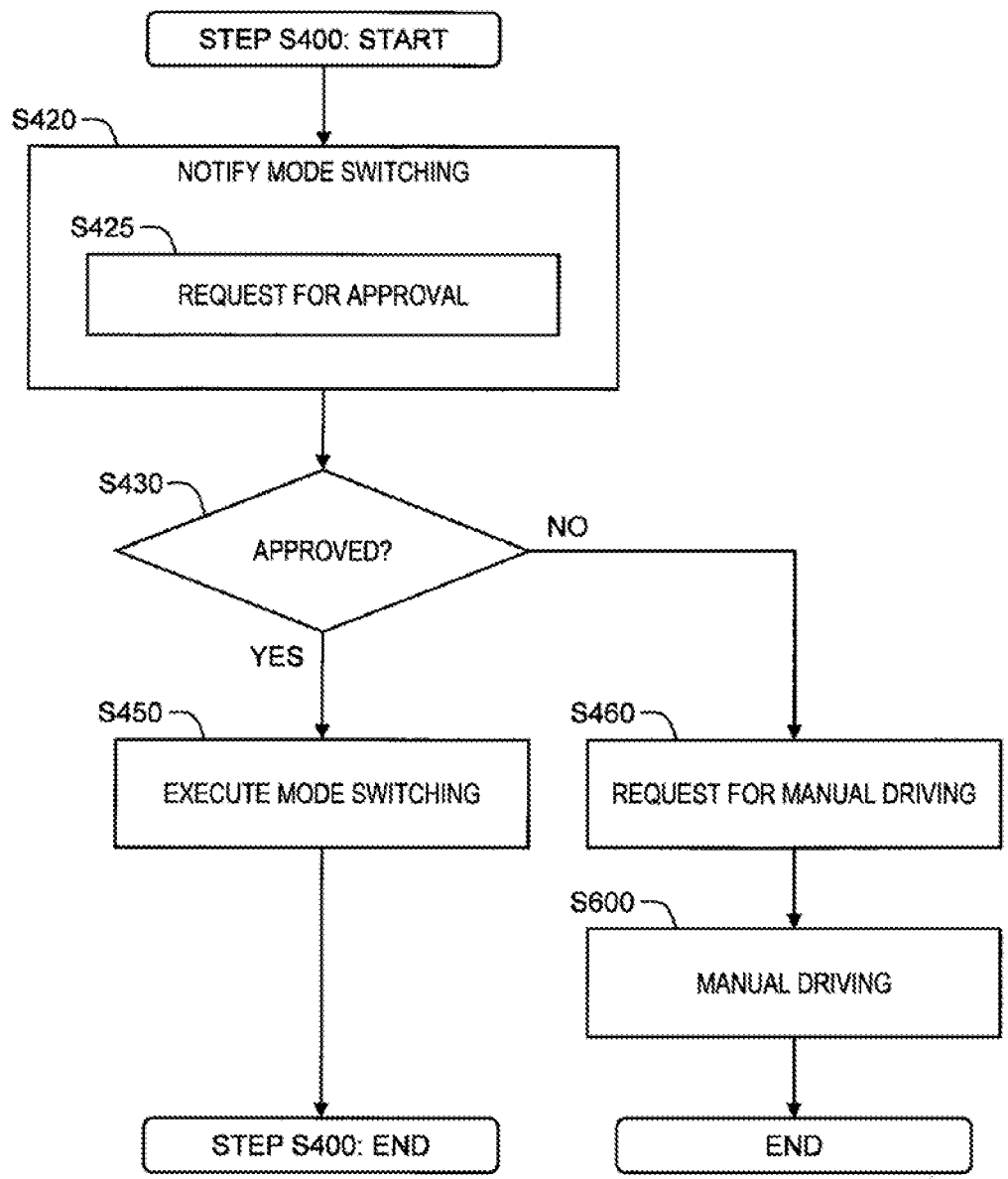
FIG. 21 is a flow chart showing a third example of the mode switching processing according to the embodiment of the present disclosure.

FIG. 21 is a flow chart showing a third example of the mode switching processing. An overlapping description with the first example will be omitted as appropriate.

In Step S420, the processor 111 notifies the occupant of the vehicle 10 of the switching of the selected control mode MS through the HMI unit 140 (i.e., the output device). This Step S420 includes Step S425 that requests the occupant for "approval" of the switching.

The occupant (e.g., the driver) approves or refuses the switching by using the HMI unit 140 (i.e., the input device). When the occupant approves the switching (Step S430; Yes), the processing proceeds to Step S450. As a result, the same effects as in the case of the first example are obtained.

On the other hand, when the occupant refuses the switching (Step S430; No), the processing proceeds to Step S460. In Step S460, the processor 111 requests, through the HMI unit 140 (i.e., the output device), the driver of the vehicle 10 to perform manual driving. At the same time, the processor 111 may issue an alarm.

In response to the request for manual driving, the driver of the vehicle 10 performs the manual driving (Step S600). During execution of the manual driving, the processor 111 may beforehand switch the selected scene description information DS. Furthermore, the processor 111 may notify, through the HMI unit 140 (i.e., the output device), the driver that "resumption of the driving assist control of the selected control mode MS is possible." The driver uses the HMI unit 140 (i.e., the input device) to instruct the driving assist system 100 to resume the driving assist control. In this manner, it is possible to efficiently resume the driving assist control.

According to the third example, as described above, the occupant of the vehicle 10 is requested to approve the switching of the selected control mode MS. When the occupant approves the switching, the switching is executed. On the other hand, when the occupant refuses the switching, the switching is not executed automatically, and instead the manual driving is required. It is thus possible to reflect an intention of the occupant of the vehicle 10 in the mode switching processing. This is preferable from a viewpoint of convenience.

3-4. Fourth Example

Figure 22:
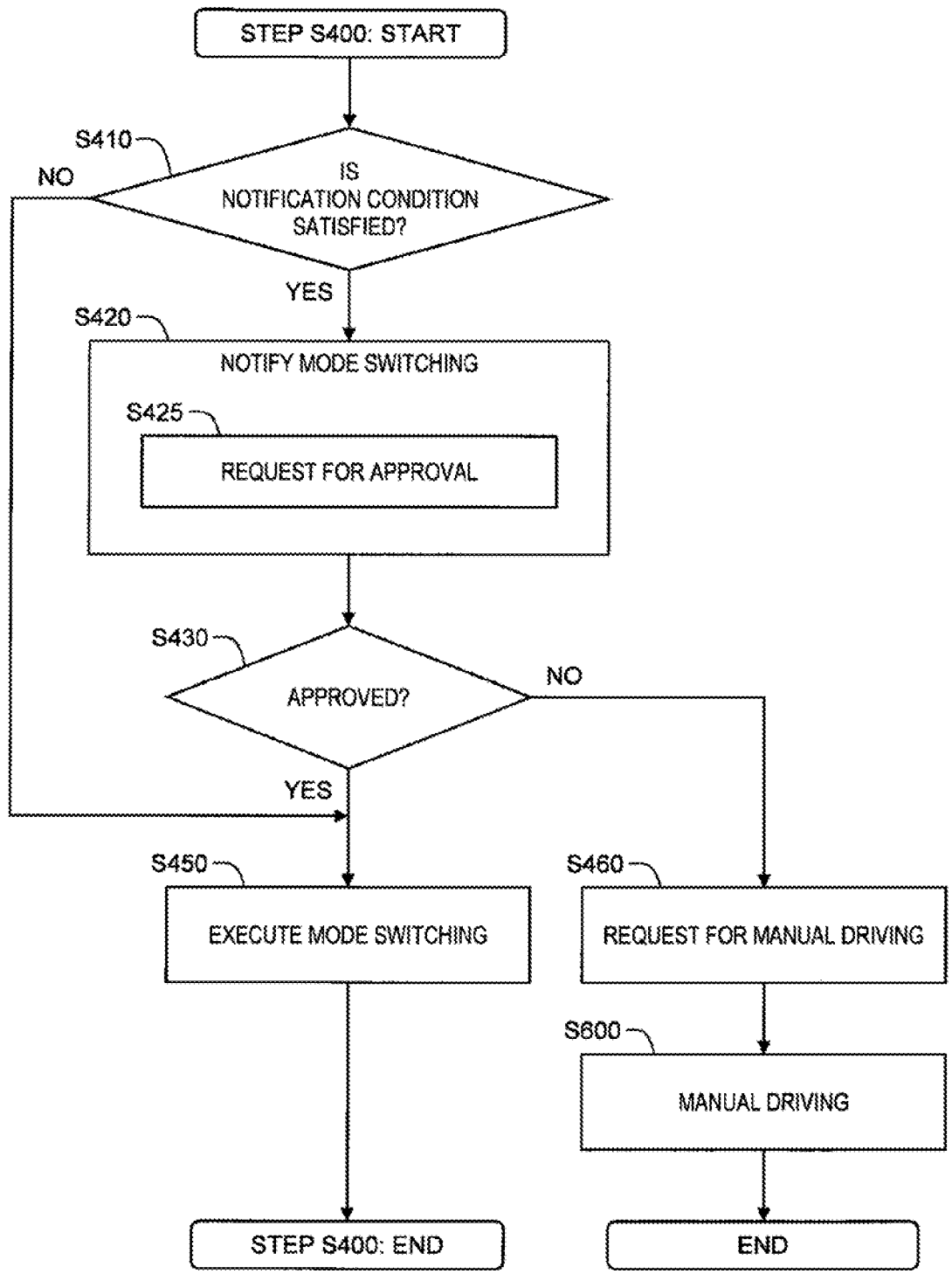
FIG. 22 is a flow chart showing a fourth example of the mode switching processing according to the embodiment of the present disclosure.

FIG. 22 is a flow chart showing a fourth example of the mode switching processing. The fourth example is a combination of the second example and the third example. An overlapping description with the second and third examples will be omitted as appropriate.

In Step S410, the processor 111 determines whether or not the notification condition is satisfied. When the notification condition is satisfied (Step S410; Yes), the processing proceeds to Step S420. On the other hand, when the notification condition is not satisfied (Step S410; No), the processing proceeds to Step S450.

In Step S420, the processor 111 notifies the occupant of the vehicle 10 of the switching of the selected control mode MS. At this time, the processor 111 requests the occupant for approval of the switching (Step S425).

When the occupant approves the switching (Step S430; Yes), the processing proceeds to Step S450. In Step S450, the processor 111 executes the switching of the selected control mode MS.

On the other hand, when the occupant refuses the switching (Step S430; No), the processing proceeds to Step S460. In Step S460, the processor 111 requests the driver of the vehicle 10 to perform manual driving.

According to the fourth example, both of the effects by the second example and the effects by the third example are obtained.

3-5. Fifth Example

If the subject scene ST after the change is highly dangerous, the processor 111 may not only make the notification to the occupant of the vehicle 10 but also forcibly activate an emergency avoidance mode.

What is claimed is:

1. A driving assist system that assists driving of a vehicle, the driving assist system comprising:
a processor configured to execute driving assist control that has a plurality of control modes associated with a plurality of scenes on a one-to-one basis; and
a memory device in which driving environment information indicating a driving environment for the vehicle and plural pieces of scene description information respectively defining the plurality of scenes are stored, wherein
the processor recognizes a scene corresponding to the driving environment among the plurality of scenes as a subject scene, based on the driving environment information and the plural pieces of scene description information, a selected control mode is one associated with the subject scene among the plurality of control modes, selected scene description information is one defining the subject scene among the plural pieces of scene description information and indicates parameters used in the driving assist control of the selected control mode, the processor executes the driving assist control of the selected control mode based on the parameters indicated by the selected scene description information, and switches the selected control mode by switching the selected scene description information, and when the subject scene changes from a first scene to a second scene, the processor notifies an occupant of the vehicle of switching of the selected control mode before switching the selected scene description information and the selected control mode, wherein when notifying the occupant of the switching, the processor requests the occupant for approval of the switching, when the occupant approves the switching, the processor executes the switching, when the occupant refuses the switching, the processor requests a driver of the vehicle to perform manual driving, and when the occupant refuses the switching, the processor beforehand switches the selected scene description information during execution of the manual driving and notifies the driver that resumption of the driving assist control is possible.

2. The driving assist system according to claim 1, wherein at least a part of the parameters indicated by the selected scene description information regarding the second scene is not indicated by the selected scene description information regarding the first scene.

3. The driving assist system according to claim 1, wherein when the subject scene changes from a third scene to a fourth scene, the processor executes the switching without beforehand notifying the occupant of the switching of the selected control mode.

4. The driving assist system according to claim 3, wherein all of the parameters indicated by the selected scene description information regarding the fourth scene are included in the parameters indicated by the selected scene description information regarding the third scene.

5. The driving assist system according to claim 1, wherein each of the plurality of scenes is defined by a configuration of the vehicle and a moving object in a predetermined space around the vehicle.

6. The driving assist system according to claim 5, wherein the parameters include:

vehicle parameters including a lane in which the vehicle exists, a position of the vehicle, and a velocity of the vehicle; and moving object parameters including a lane in which the moving object exists, a position of the moving object, and a velocity of the moving object.

* * * * *